United States Patent
Zanier et al.

(10) Patent No.: US 10,382,226 B2
(45) Date of Patent: Aug. 13, 2019

(54) INTEGRATED SERVICES PROCESSING FOR MOBILE NETWORKS

(71) Applicant: NOKIA SOLUTIONS AND NETWORKS OY, Espoo (FI)

(72) Inventors: Paolo Zanier, Munich (DE); Rainer Stademann, Berg (DE); Hanspeter Ruckstuhl, Wolfratshausen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 60 days.

(21) Appl. No.: 15/553,429

(22) PCT Filed: Feb. 24, 2015

(86) PCT No.: PCT/EP2015/053820
§ 371 (c)(1),
(2) Date: Aug. 24, 2017

(87) PCT Pub. No.: WO2016/134752
PCT Pub. Date: Sep. 1, 2016

(65) Prior Publication Data
US 2018/0248713 A1    Aug. 30, 2018

(51) Int. Cl.
*H04L 12/46* (2006.01)
*H04W 76/12* (2018.01)
*H04W 88/08* (2009.01)

(52) U.S. Cl.
CPC ......... *H04L 12/4633* (2013.01); *H04W 76/12* (2018.02); *H04W 88/08* (2013.01)

(58) Field of Classification Search
CPC .... H04L 12/4633; H04W 76/12; H04W 88/08
See application file for complete search history.

(56) References Cited

U.S. PATENT DOCUMENTS 8,612,612 B1 * 12/2013 Dukes ................. H04L 67/14
                                                      370/230
8,855,071 B1 * 10/2014 Sankaran ........... H04W 76/021
                                                      370/329
(Continued)

FOREIGN PATENT DOCUMENTS

WO    WO 2015/144226 A1    10/2015

OTHER PUBLICATIONS

International Search Report and Written Opinion dated Oct. 16, 2015 corresponding to International Patent Application No. PCT/EP2015/053820.

(Continued)

*Primary Examiner* — Jay P Patel
(74) *Attorney, Agent, or Firm* — Squire Patton Boggs (US) LLP

(57) ABSTRACT

The present invention provides apparatuses, methods, computer programs, computer program products and computer-readable media regarding integrated services processing for mobile networks. The method comprises associating, at the base station of a mobile packet network, a service port of a radio modem of user equipment in the mobile packet network with a user plane packet processing function, sending, by the base station, a service frame received from said service port to the user plane packet processing function of the base station, determining, by the base station, at least one destination tunnel end point out of a plurality of destination tunnel end points according to forwarding rules, and sending, by the base station, the service frame to the selected destination tunnel end point by encapsulating the service frame into a frame of a transport network underlay which is addressed to the destination tunnel end point, wherein the destination tunnel end point is associated with a physical or virtual interface on another radio modem of another user (Continued)

equipment in a mobile packet network or on a fixed network termination.

20 Claims, 24 Drawing Sheets

(56) References Cited

U.S. PATENT DOCUMENTS

| | | | |
|---|---|---|---|
| 2010/0067489 A1* | 3/2010 | Pelletier | H04W 48/17 370/331 |
| 2011/0320608 A1 | 12/2011 | Nelakonda et al. | |
| 2013/0088977 A1* | 4/2013 | Baillargeon | H04L 43/0811 370/251 |
| 2013/0265917 A1* | 10/2013 | Lv | H04W 24/02 370/310 |
| 2014/0003357 A1* | 1/2014 | Ejzak | H04W 76/12 370/329 |
| 2014/0019581 A1* | 1/2014 | Baillargeon | H04W 28/12 709/217 |
| 2014/0153572 A1 | 6/2014 | Hampel et al. | |
| 2014/0233384 A1* | 8/2014 | Howard | H04W 28/0289 370/235 |
| 2014/0241247 A1 | 8/2014 | Kempf et al. | |
| 2015/0036687 A1* | 2/2015 | Belling | H04L 12/4633 370/392 |
| 2015/0049632 A1* | 2/2015 | Padmanabhan | H04L 67/34 370/254 |
| 2015/0146513 A1* | 5/2015 | Zakrzewski | H04W 24/04 370/216 |
| 2015/0146517 A1* | 5/2015 | Zakrzewski | H04W 24/04 370/218 |
| 2015/0146723 A1* | 5/2015 | Zakrzewski | H04L 47/32 370/392 |
| 2016/0072634 A1* | 3/2016 | Khan | H04L 12/189 370/312 |
| 2016/0234806 A1* | 8/2016 | Le Thierry D'ennequin | H04W 4/06 |
| 2018/0262424 A1* | 9/2018 | Roeland | H04L 12/4633 |

OTHER PUBLICATIONS

J. Kempf et al., "Moving the Mobile Evolved Packet Core to the Cloud," 2012 IEEE 8th International Conference on Wireless and Mobile Computing, Networking and Communications (WIMOB 2012); Barcelona, Spain, Oct. 8-10, 2012, Oct. 8, 2012, pp. 784-791, XP002717394.

Georg Hampel et al., "Applying Software-Defined Networking to the Telecom Domain," 16th IEEE Global Internet Symposium, IEEE, 2013, pp. 133-138.

Siwar Ben Hadj Said et al., "New Control Plane in 3GPP LTE/EPC Architecture for On-Demand Connectivity Service," IEEE 2nd International Conference on Cloud Networking (CloudNet): Short Paper, IEEE 2013, pp. 205-209.

D. Meyer, "Administratively Scoped IP Multicast," Network Working Group, RFC 2365, Jul. 1998, pp. 1-8.

M. Mahalingam et al., "Virtual extensible Local Area Network (VXLAN) : A Framework for Overlaying Virtualized Layer 2 Networks over Layer 3 Networks," Independent Submission, RFC 7348, Aug. 2014.

Nov. 13, 2018 Extended Search Report issued in European Patent Application No. 15706789.3.

* cited by examiner

INTEGRATED SERVICES PROCESSING FOR MOBILE NETWORKS

FIELD OF THE INVENTION

The present invention relates to apparatuses, methods, systems, computer programs, computer program products and computer-readable media regarding integrated services processing for mobile networks.

More particular, the present invention relates to future mobile networks (LTE evolution and 5G) and the requirement to support more flexible and efficient networking services by performing service processing also in radio base stations and not only in or behind a single mobile gateway.

BACKGROUND OF THE INVENTION

FIG. 1 shows in a simplified manner an example of a principle on how service frames are forwarded between a UE and a service network based on the current 3G/4G core network architecture. All service frames are forwarded along an end-to-end bearer between the user equipment (UE) and a single mobile gateway (GW). The GW is selected based on an access point name (APN) as specified by the UE or stored in the subscription profile.

For the forwarding purpose, two tunnel end points (TEP) are maintained for a bearer in the network. If the UE sends a service frame to the base station, the base station encapsulates this service frame with a GTP-u (GTP, GPRS (General Packet Radio Service) Tunnel Protocol) protocol header using 'TEP b' and sends the encapsulated frame into the transport network underlay which routes it to the gateway. In downstream direction, the GW encapsulates a service frame destined for the UE with a GTP-u protocol header using 'TEP a' and sends the encapsulated packet into the transport network underlay which routes the packet to the base station. The base station looks up the UE and radio access bearer (RAB) associated with 'TEP a' and forwards the service frame towards the UE.

FIG. 2 shows the same principle, but now applied to access a local service.

It is important to note, that in 3G/4G networks it is not possible to access two service networks, e.g. a local service network and central service network, each with its own gateway, neither by using the same bearer nor by using a single PDN (Packet Data Network) connection. It would only be possible by setting up two simultaneous PDN connections, which has the disadvantage of becoming visible to the UE and its application software.

Specifically, it is not possible to support in 3G/4G a use case as shown in FIG. 3. This use case represents a multi edge scenario with a central edge site for accessing the Internet and with a local edge for accessing the cached content of a content distribution network (CDN). The service topology involves now three tunnel end points. Both gateways need to know about 'TEP a' to forward service frames to the UE. Additionally the base station (BS) needs to have a service processing function, which examines the destination IP address of service frames sent by the UE and decides if to encapsulate the service frame with a GTP header using 'TEP b' or using 'TEP c'.

FIG. 4 shows another service topology also with three tunnel end points, but now only involving UE and no network gateways. In this use case, the three UEs can communicate directly with each other without involving a gateway. Each base station needs to select the appropriate GTP tunnel end point in dependence of the destination IP address of a service frame received from the UE over the radio. Service topologies like shown in FIG. 4 are needed to support low latency virtual private network services, e.g. as being required for vehicular ad hoc networking (VANET).

Virtual private networking (VPN) service means that users of this service can use their own addressing scheme without the need to coordinate with other services or networks. Low latency implies that forwarding in the user plane shall minimize delay by forwarding packets on a shortest path, avoiding intermediate forwarding hops as far as possible.

In addition to lowest latency, mission critical services require highest service availability and reliability even in case of partial network failures. This requirement favours a decentralized architecture in user and control plane avoiding by design single point of failures.

FIG. 5 combines the use case of FIG. 4 with that of a central gateway. While UE a, UE b and UE c can directly communicate with each other, they are also able to communicate with a central service network using a mobile gateway GW. The figure also indicates on the bottom a set of UEs which only can communicate via the central GW as it is the case in 3G/4G networks. These UEs at the bottom cannot directly send or receive service frames to or from other UE.

FIGS. 6 and 7 show typical examples of LTE distributed u-plane implementations. These architectures require interconnecting UEs behind the PGW-D (PGW, PDN Gateway) function or egress SDN FE (Software Defined Network Forwarding Element) (providing SGi), i.e. in the internet or a private IP network (cf. documents [1] and [2]).

FIG. 8 illustrates an alternative solution for providing VPN services, specifically a L3VPN (Layer 3 Virtual Private Network) implementation where the Provider Edge router is included in LTE P-GW (PGW-D or egress SDN FE in FIGS. 6 and 7). The disadvantage of this solution is that each UE is still anchored to a stationary user plane gateway and therefore handovers will result in inefficient routing and traffic trom boning.

REFERENCES

[1]: "Applying Software-Defined Networking to the Telecom Domain", Georg Hampel et al;

[2]: "New Control Plane in 3GPP LTE/EPC Architecture for On-Demand Connectivity Service", Siwar Ben Hadj Said et al.

SUMMARY OF THE INVENTION

It is therefore an object of the present invention to overcome the above mentioned problems and to provide apparatuses, methods, systems, computer programs, computer program products and computer-readable media regarding integrated services processing for mobile networks.

According to an aspect of the present invention there is provided a method comprising:
associating, at a base station of a mobile packet network, a service port of a radio modem of user equipment in the mobile packet network with a user plane packet processing function,
sending, by the base station, a service frame received from said service port to the user plane packet processing function of the base station,
determining, by the base station, at least one destination tunnel end point out of a plurality of destination tunnel end points according to forwarding rules, and sending, by the base station, the service frame to the selected destination tunnel end point by encapsulating the service frame into a frame of a transport network underlay which is addressed to the destination tunnel end point, wherein the destination tunnel end point is associated with a physical or virtual interface on another radio modem of another user equipment in a mobile packet network or on a fixed network termination.

According to another aspect of the present invention there is provided a method comprising:

associating, at a fixed access node connected to the transport network underlay of a mobile packet network, a service port of a fixed network termination with a user plane packet processing function, sending, by the fixed access node, a service frame received from said service port to the user plane packet processing function of the fixed access node, determining, by the fixed access node, at least one destination tunnel end point out of a plurality of destination tunnel end points according to forwarding rules, and sending, by the fixed access node, the service frame to the selected destination tunnel end point by encapsulating the service frame into a frame of a transport network underlay which is addressed to the destination tunnel end point, wherein the destination tunnel end point is associated with a physical or virtual interface on a radio modem of a user equipment in a mobile packet network or on a mobile network gateway.

According to another aspect of the present invention there is provided an apparatus comprising:

at least one processor, and at least one memory for storing instructions to be executed by the processor, wherein the at least one memory and the instructions are configured to, with the at least one processor, cause the apparatus at least to perform:

associating, at a base station of a mobile packet network, a service port of a radio modem of user equipment in the mobile packet network with a user plane packet processing function, sending, by the base station, a service frame received from said service port to the user plane packet processing function of the base station, determining, by the base station, at least one destination tunnel end point out of a plurality of destination tunnel end points according to forwarding rules, and sending, by the base station, the service frame to the selected destination tunnel end point by encapsulating the service frame into a frame of a transport network underlay which is addressed to the destination tunnel end point, wherein the destination tunnel end point is associated with a physical or virtual interface on another radio modem of another user equipment in a mobile packet network or on a fixed network termination.

According to another aspect of the present invention there is provided an apparatus comprising:

at least one processor, and at least one memory for storing instructions to be executed by the processor, wherein the at least one memory and the instructions are configured to, with the at least one processor, cause the apparatus at least to perform:

associating, at a fixed access node connected to the transport network underlay of a mobile packet network, a service port of a fixed network termination with a user plane packet processing function, sending, by the fixed access node, a service frame received from said service port to the user plane packet processing function of the fixed access node, determining, by the fixed access node, at least one destination tunnel end point out of a plurality of destination tunnel end points according to forwarding rules, and sending, by the fixed access node, the service frame to the selected destination tunnel end point by encapsulating the service frame into a frame of a transport network underlay which is addressed to the destination tunnel end point, wherein the destination tunnel end point is associated with a physical or virtual interface on a radio modem of a user equipment in a mobile packet network or on a mobile network gateway.

According to another aspect of the present invention there is provided an apparatus comprising:

means for associating, at a base station of a mobile packet network, a service port of a radio modem of user equipment in the mobile packet network with a user plane packet processing function, means for sending, by the base station, a service frame received from said service port to the user plane packet processing function of the base station, determining, by the base station, at least one destination tunnel end point out of a plurality of destination tunnel end points according to forwarding rules, and means for sending, by the base station, the service frame to the selected destination tunnel end point by encapsulating the service frame into a frame of a transport network underlay which is addressed to the destination tunnel end point, wherein the destination tunnel end point is associated with a physical or virtual interface on another radio modem of another user equipment in a mobile packet network or on a fixed network termination.

According to another aspect of the present invention there is provided an apparatus comprising:

means for associating, at a fixed access node connected to the transport network underlay of a mobile packet network, a service port of a fixed network termination with a user plane packet processing function, means for sending, by the fixed access node, a service frame received from said service port to the user plane packet processing function of the fixed access node, means for determining, by the fixed access node, at least one destination tunnel end point out of a plurality of destination tunnel end points according to forwarding rules, and means for sending, by the fixed access node, the service frame to the selected destination tunnel end point by encapsulating the service frame into a frame of a transport network underlay which is addressed to the destination tunnel end point, wherein the destination tunnel end point is associated with a physical or virtual interface on a radio modem of a user equipment in a mobile packet network or on a mobile network gateway.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
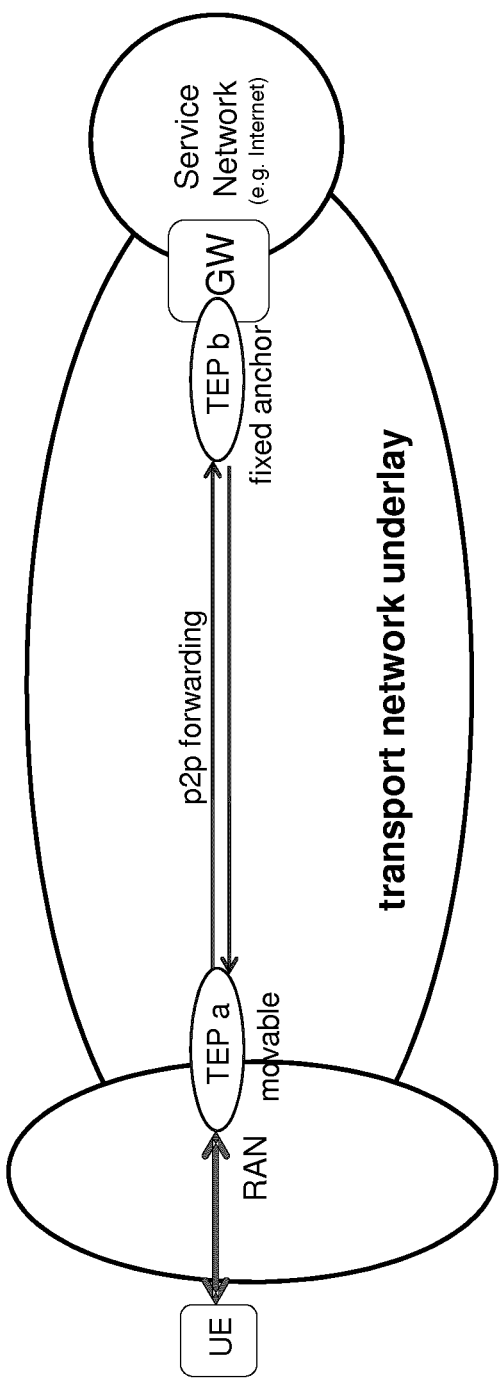
FIG. 1 is a diagram illustrating an example of a principle of service frame forwarding between a UE and a service network in 3G/4G networks.
Figure 2:
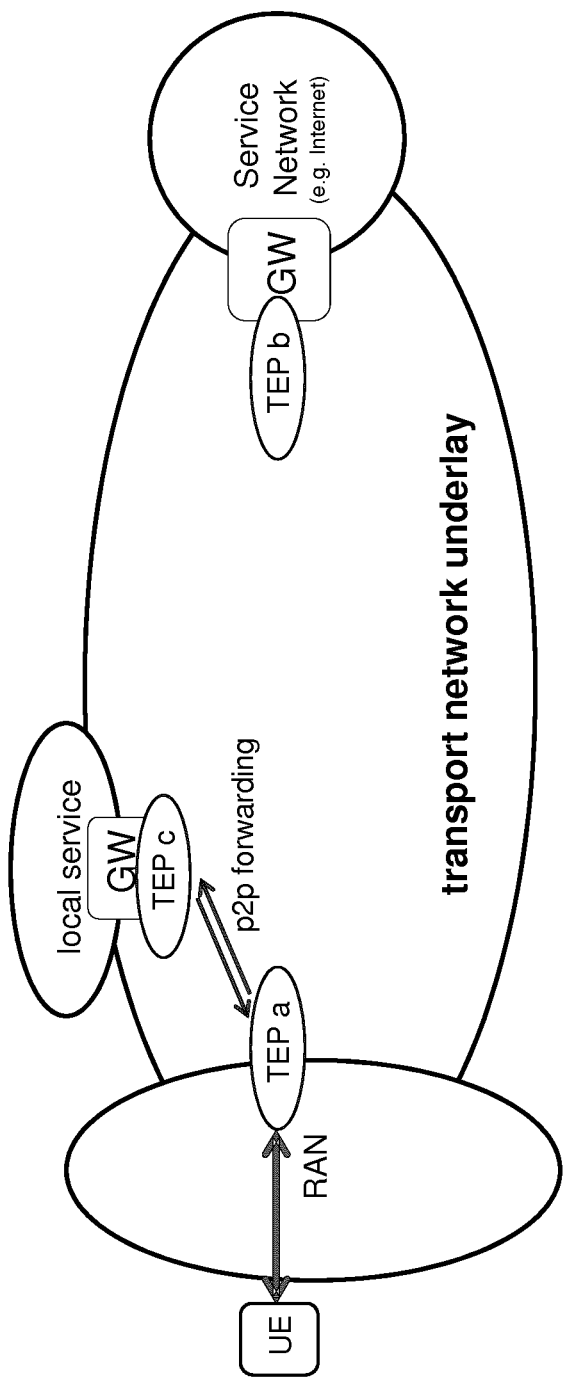
FIG. 2 is a diagram illustrating an example of a principle of service frame forwarding between a UE and a local service.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such types of communication systems or communication networks, but is also applicable in other types of communication systems or communication networks, like for example 5G communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, network access control elements like AAA servers and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

Figure 4:
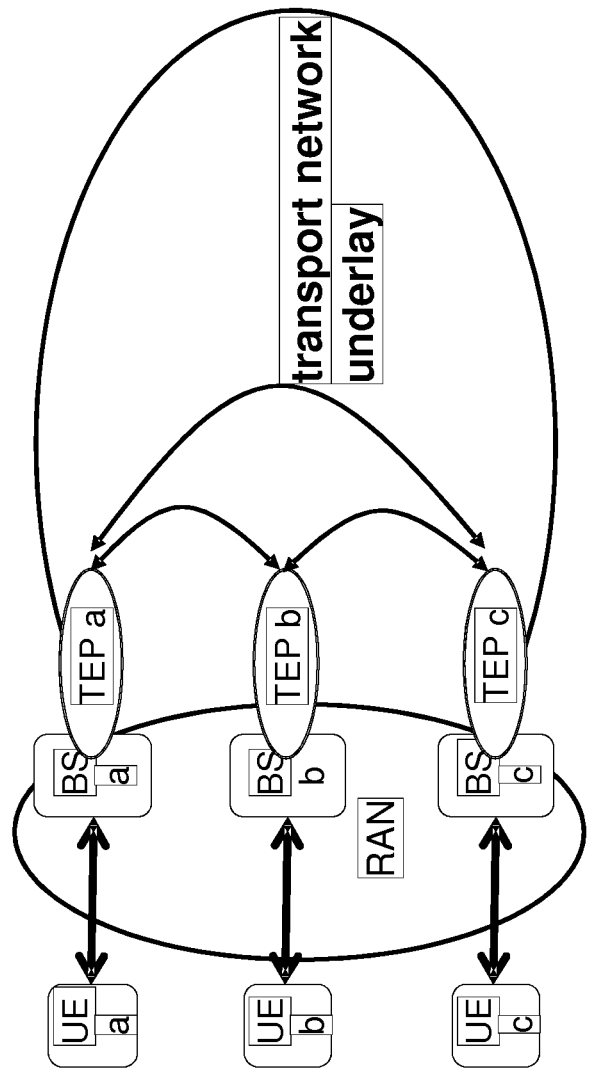
FIG. 4 is a diagram illustrating another example of a service topology involving three tunnel end points without gateways.
Figure 5:
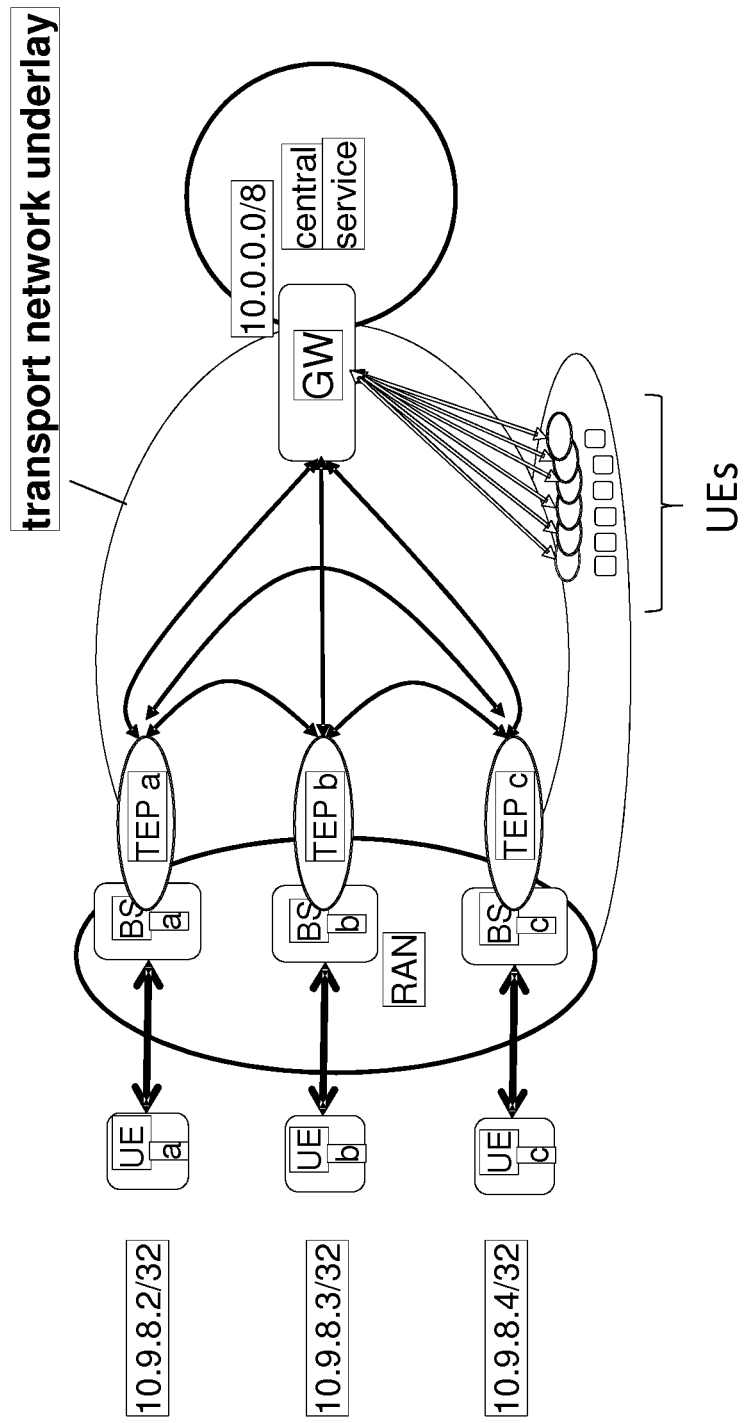
FIG. 5 is a diagram illustrating another example of a service topology with a central gateway and direct UE to UE forwarding for specific UEs.
Figure 6:
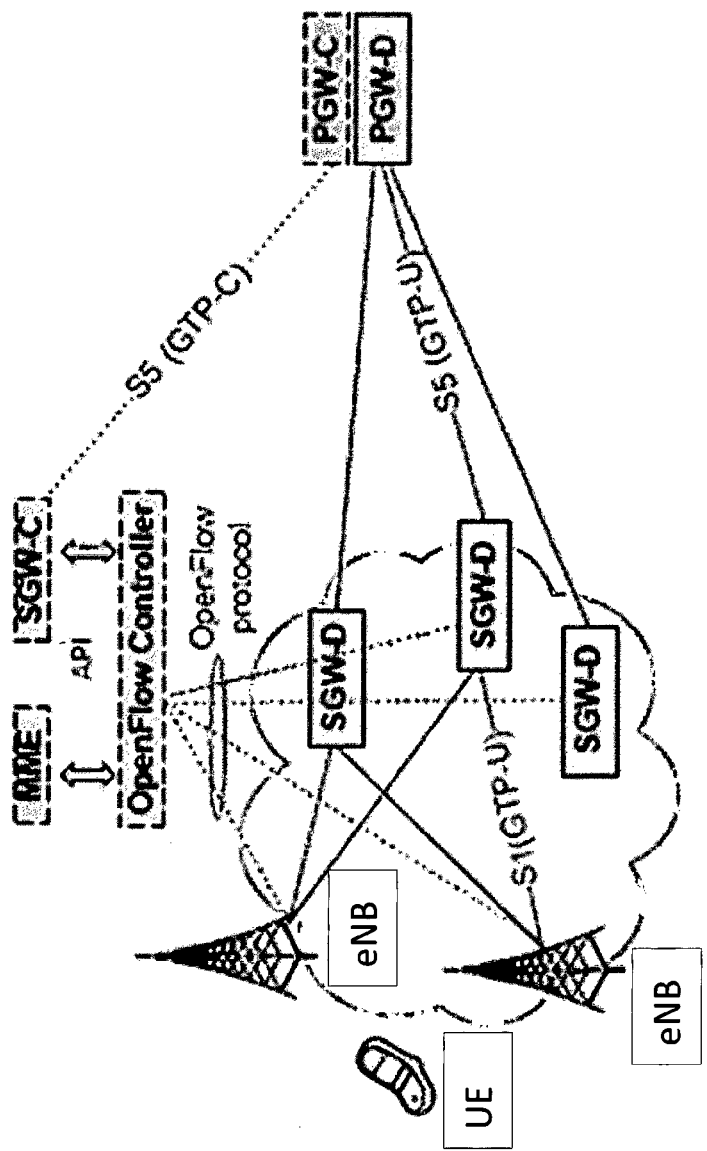
FIG. 6 is a diagram illustrating an example of an Open-Flow based LTE/EPC architecture.
Figure 7:
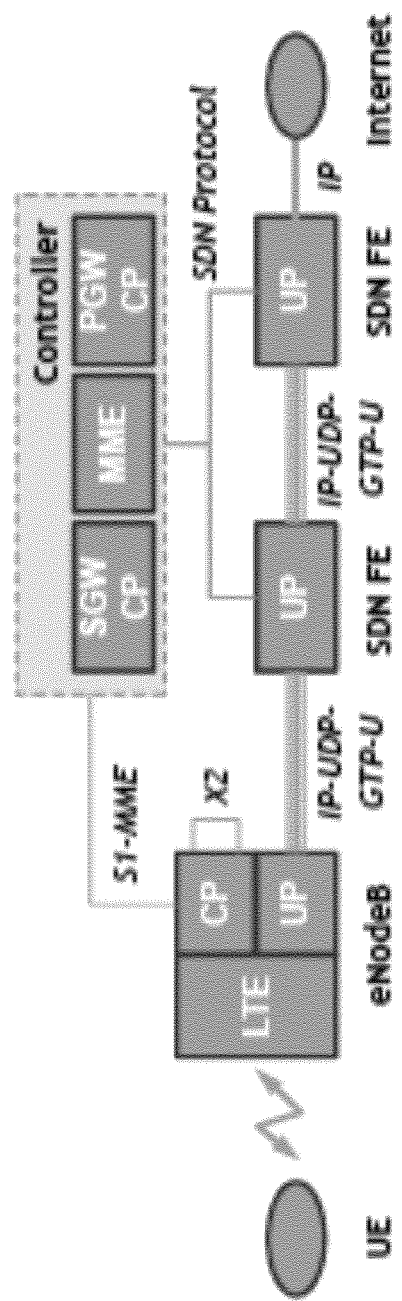
FIG. 7 is a diagram illustrating an example of a SDN based architecture of system architecture evolution.
Figure 8:
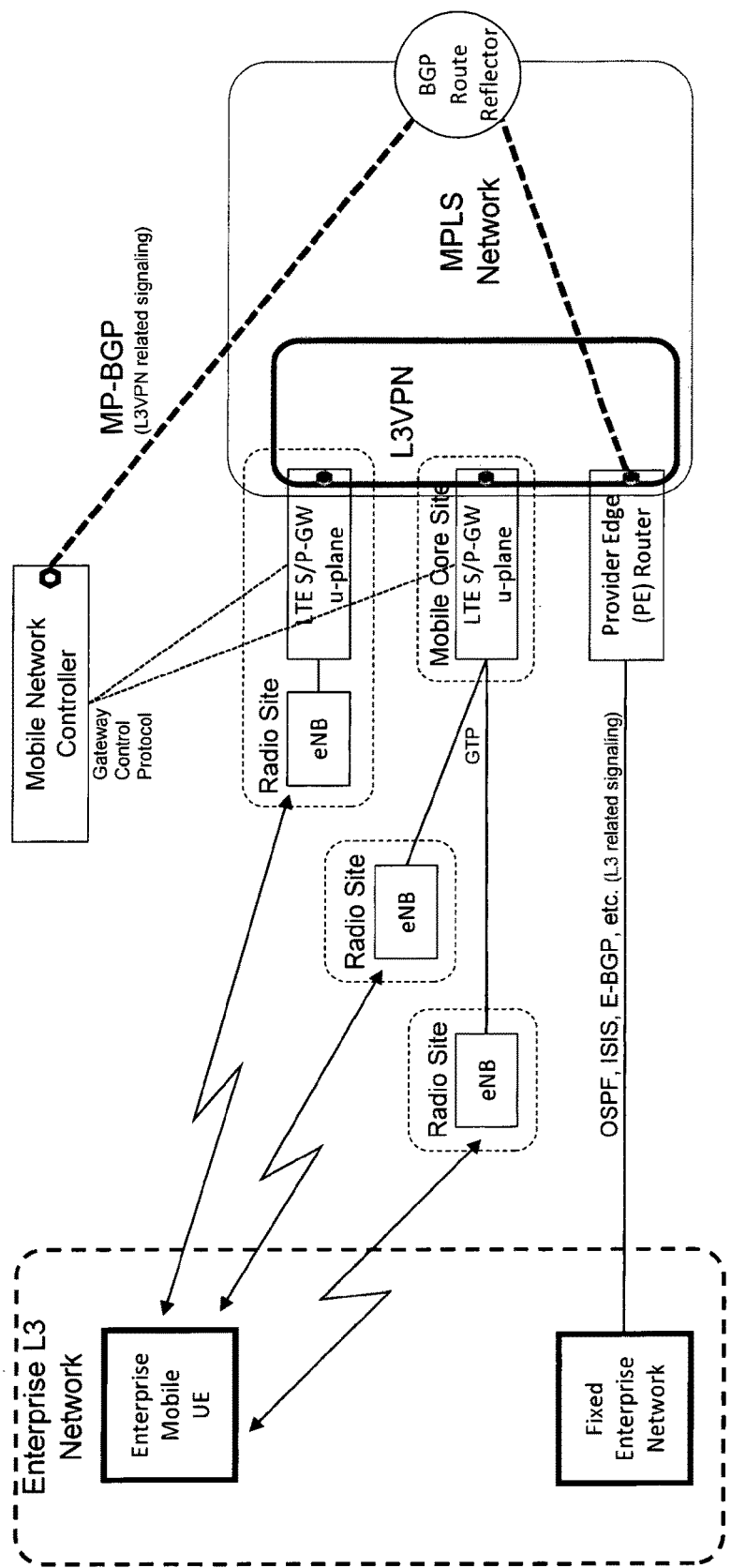
FIG. 8 is a diagram illustrating an example of mobile access to L3VPN.

It is an object of the present invention to solve the problem of supporting service topologies and use cases similar to those described above with respect to FIG. 3 to FIG. 5.

Figure 9:
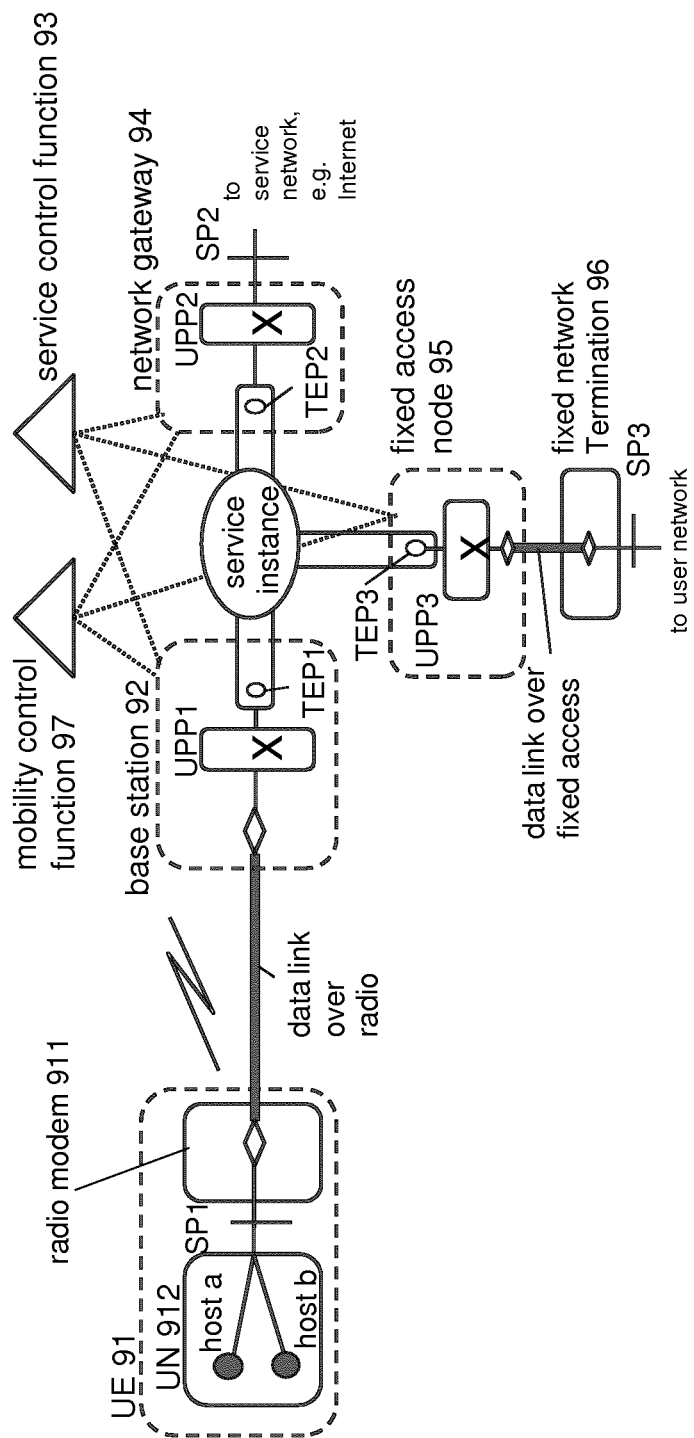
FIG. 9 is a diagram illustrating an example of network architecture according to some example versions of the present invention.

FIG. 9 is a diagram illustrating an example of a network architecture on which the present invention is based.

On the left of FIG. 9, a radio access is shown with an example UE 91 and an example base station 92.

The UE 91 is composed of a radio modem 911 and a user network (UN) 912. The user network 912 and the radio modem 911 are interconnected to each other via a physical (e.g. Ethernet I/F) or virtual interface (e.g. VLAN) SP1 (also referred to as service port 1). This interface transports frames of a single service instance between radio modem 911 and the user network 912. Generally, also at the service ports SP2 and SP3 networks or sub-networks can be connected. Each of these networks or sub-networks may comprise multiple hosts, e.g. customer premise equipment in case of a user network or servers in case of a service network, each host being addressable by a unique network service address.

The service port SP1 is connected in the radio modem 911 to an end point of a point-to-point data link which extends over the radio and terminates finally in a base station 92.

In 3G/4G architecture the equivalent of a service port corresponds to an interface of a 3G/4G radio modem in a UE, which is associated to a single PDN connection.

According to some example versions of the present invention, the frames received from the service port SP1 are sent to a user plane packet processing function (UPP1) in the base station 92. Generally, a UPP operates in the user plane on the service frames. Specifically and according to some example versions of the present invention, the UPP1 selects for each service frame received from the service port SP1 one or more destination service ports, for example in the scenario of FIG. 9, one of the ports SP2 or SP3. This selection is done by the UPP1 according to a plurality of service forwarding rules.

According to some example versions of the present invention, all or a subset of said plurality of forwarding rules are populated by a service control function 93.

In a next step, the UPP1 looks up for each selected destination service port the associated tunnel end point and sends the service frame to said selected destination service ports by encapsulating said service frame into frames of a transport network underlay which are addressed to the destination tunnel end points associated with the respective destination service ports.

If in the scenario of FIG. 9 the UPP1 in the base station has selected SP2 as the destination tunnel end point for a service frame, it encapsulates it into a transport network underlay frame using a tunnelling protocol (e.g. GTP) which it addresses to tunnel end point TEP2 associated with SP2. In a final step, UPP1 sends the frame into the transport network underlay which routes the frame towards the destination network element, which is in this case the network gateway 94.

On the receiving side, the network gateway 94 handles the received frame in the same way a mobile gateway in 3G/4G does. It looks up the service port associated with the TEP used in the GTP header of the frame and forwards the service frame towards the service port.

Similarly for the downstream direction, the base station handles received frames for a TEP in the same way a 3G/4G base station does. It looks up the service port associated with the TEP used in the GTP header of the frame and forwards the service frame towards the corresponding service port of the radio modem in the UE, by choosing the appropriate downstream data link.

The lower part of FIG. 9 shows a fixed access node 95, e.g. a digital subscriber line access multiplexer (DSLAM). The fixed access node 95 is connected to the transport network. Additionally, a fixed network termination 96 is shown which exposes a service port SP3 to a user network. Similarly to the radio modem, the fixed network termination 96 forwards frames received from the user network at the service port SP3 over a data link to a user plane packet processing function UPP3 in the fixed access node 95. UPP3 handles the received frames in the same way as UPP1 in the base station does.

FIG. 9 shows in addition to the service control function (SCF) 93 a mobility control function (MCF) 97. The mobility control function 97 informs the UPP functions in the user plane network elements on the association of service ports to tunnel end points and updates the association if it changes e.g. due to handovers, attachments or de-attachments.

In summary, according to some example versions of the present invention there is provided a radio base station of a mobile packet network with the capability to
 a) associate a service port of a radio modem with a user plane packet processing function,
 b) send service frames received from said service port to said user plane packet processing function,
 c) associate destination service ports with tunnel end points,
 d) have the user plane packet processing function select for each service frame at least one destination service port out of a plurality of destination service ports according to a plurality of service forwarding rules,
 e) send each service frame to said selected destination service ports by encapsulating said service frame into frames of a transport network underlay which are addressed to the destination tunnel end points associated with the respective destination service ports
 f) and to populate all or a subset of said service forwarding rules by a service control function
 wherein
 g) a destination service port is a physical or virtual interface on a radio modem, or on a fixed network termination or on a network gateway.

Further, according to some example versions of the present invention, there is provided a fixed access node connected to the transport network underlay of a mobile packet network with the capability to
 a) associate a service port of a fixed network termination with a user plane packet processing function,
 b) send service frames received from said service port to said user plane packet processing function,
 c) associate destination service ports with tunnel end points,
 d) have the user plane packet processing function select for each service frame at least one destination service port out of a plurality of destination service ports according to a plurality of service forwarding rules,
 e) send each service frame to said selected destination service ports by encapsulating said service frame into frames of a transport network underlay which are addressed to the destination tunnel end points associated with the respective destination service ports
 f) and to populate all or a subset of said service forwarding rules directly or indirectly by a service control function
 wherein
 g) a destination service port is a physical or virtual interface on a radio modem, or on a fixed network termination or on a network gateway.

Further, according to some example versions of the present invention, the following aspects are additionally provided:

populate or update said associations of destination service ports to tunnel end points (mobility state) by a mobility control function
 a mobility control function which implements a publish/subscribe data bus to distribute the mobility state to and between multiple network elements
 a service control function which implements a publish/subscribe data bus to distribute service processing updates to and between multiple network elements
 encapsulating said service frames into GTP-u frames, GRE frames, NVGRE frames or VXLAN frames
 have the service control function interact indirectly, via a service control gateway function, with the base stations or the fixed access nodes.
 have the user plane network elements directly determine the destination tunnel end points from forwarding rules which already have resolved service ports to tunnel end points (single step approach). In this case the service control functions would send the forwarding rules based on service ports e.g. to the mobility control function MCF. MCF takes for SCF the role of a service control gateway function and resolves the service ports used in the rules to destination tunnel end points and sends the resulting forwarding rules to the network elements.

Multi Edge Use Case

Figure 3:
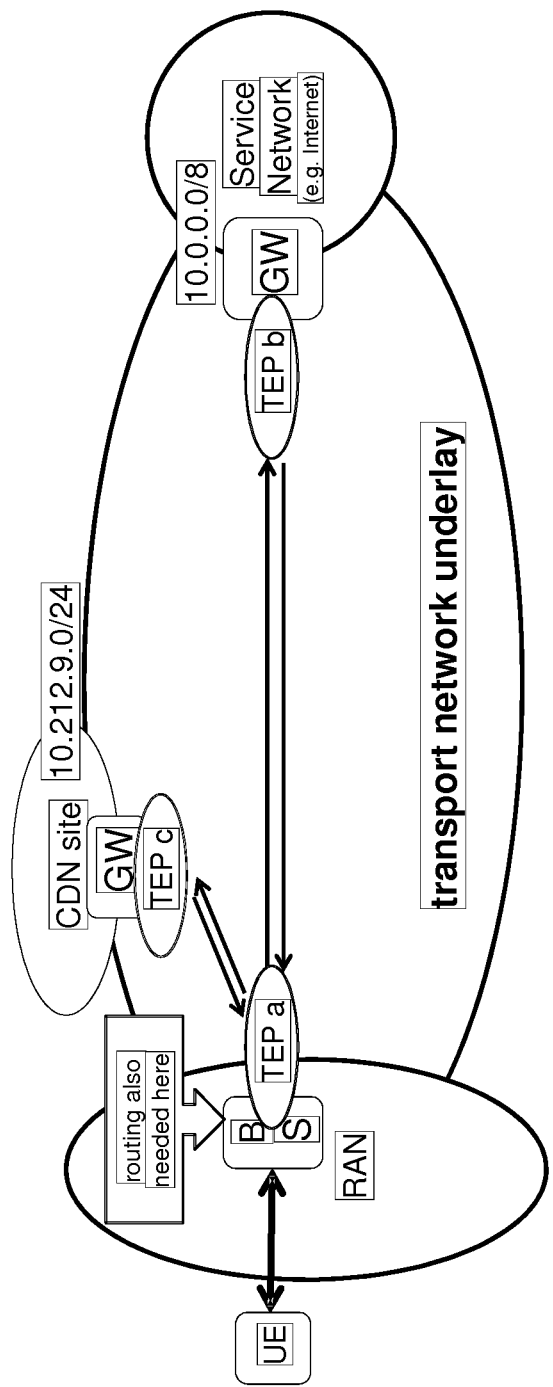
FIG. 3 is a diagram illustrating an example of a service topology involving three tunnel end points.
Figure 10:
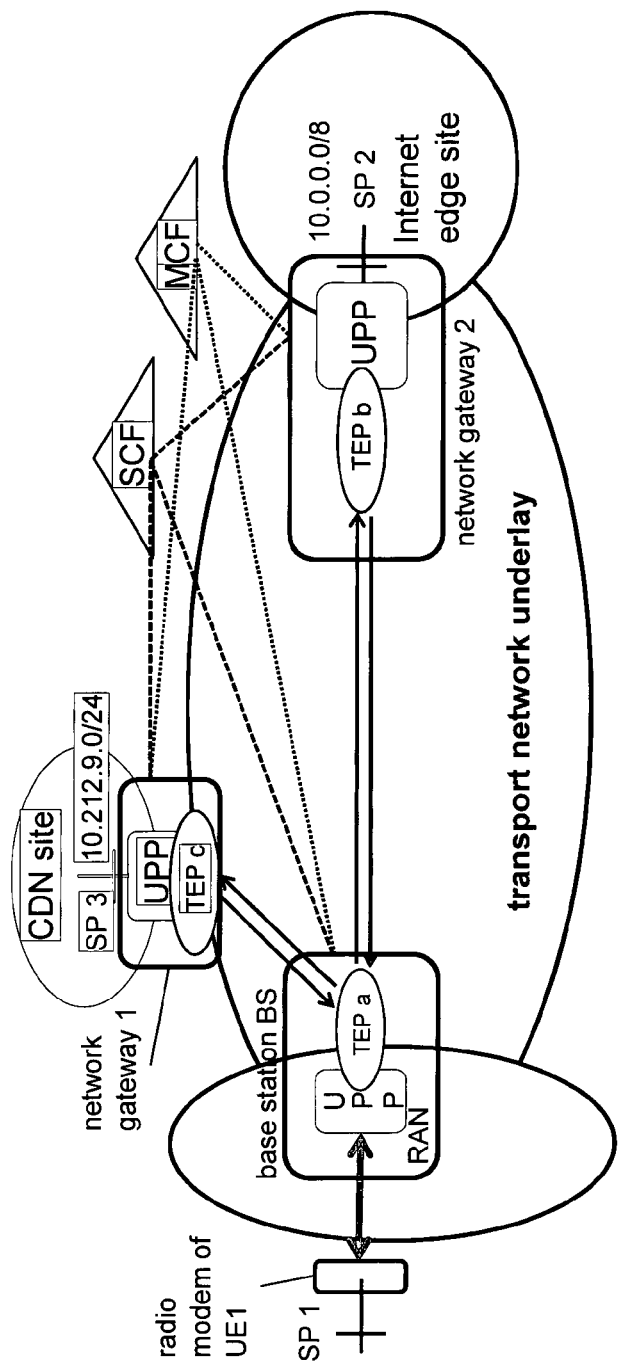
FIG. 10 is a diagram illustrating an example of a service topology involving three tunnel end points according to some example versions of the present invention.

In the following, an example of an implementation according to some example version of the present invention is described based on a premium Internet use case with a CDN edge of FIG. 3. FIG. 10 is a diagram showing again the respective scenario but now shows also the service ports at each site.

According to some example versions of the present invention, in FIG. 10, it is assumed that the service port SP1 is associated with a UPP function in the base station BS and that the UPP function receives service frames from service port SP1. Further, it is assumed that the base station BS keeps associations between destination service ports and tunnel end points. According to some example versions of the present invention, the base station does this by maintaining the associations per service instance in a mobility lookup table. An example of such a table is shown for the service instance "premium Internet" in Table 1.

TABLE 1

| service instance | destination service port | TEP |
|---|---|---|
| premium internet | SP3 | TEPc |
|  | SP2 | TEPb |
|  | SP1 | TEPa |

According to some example versions of the present invention, it is now assumed that the UPP function of the base station selects for each service frame received from SP1 a destination service port. Here, the base station does this by a longest prefix match of the destination address of each service frame with a service forwarding table as depicted in Table 2.

TABLE 2

| service instance | destination service port | service port |
|---|---|---|
| premium internet | 10.212.9.0/24 | SP3 |
|  | 10.0.0.0/8 | SP2 |

For example, if it receives an IP frame with a destination IP address from the range 10.212.9.0/24 it selects SP3 as destination service port. Otherwise, if it is from the range 10.0.0.0/8, it selects SP2 as destination service port. After UPP has determined the destination service port it looks up the destination tunnel end point by a lookup into Table 1. In a next step, UPP encapsulates the service frame into a frame of the transport network underlay using the tunnel header of the selected destination tunnel end point and sends the transport frame over the transport network underlay to the destination tunnel end point and the associated service port.

FIG. 10 also shows a service control function (SCF). In accordance with the invention this service control function is used to populate and update the service forwarding rules of Table 2. E.g. when a new service edge (e.g. a new CDN site) is added to the service instance, the service control function downloads a new mapping rule between service frame and service port to the base stations.

FIG. 10 also shows a mobility control function (MCF). In accordance to some example versions of the present invention, this mobility control function is used to populate and update the associations of tunnel end points with destination service ports (i.e. Table 1) in the user plane network elements (e.g. base stations, network gateways and fixed access nodes). For example, if in the present example UE1 is handed over to another base station at another radio site, the associated tunnel end point to destination service port SP1 is changed. Therefore the mobility control function will update the respective mobility lookup tables in the user plane network elements.

Figure 11:
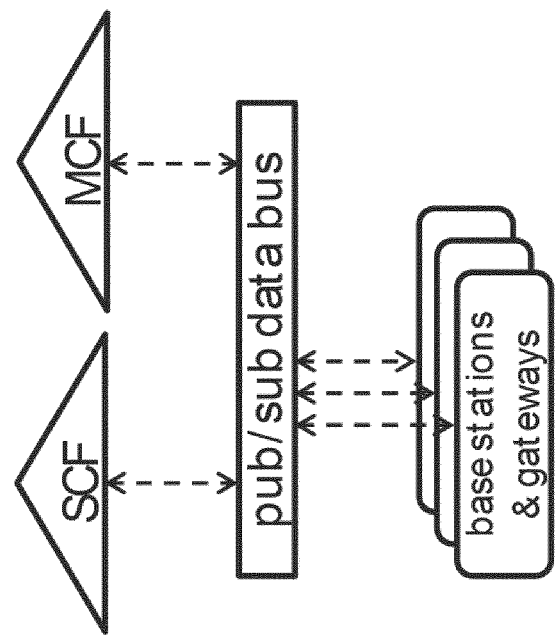
FIG. 11 is a diagram illustrating an example of distributing mobility and service state updates using a publish-subscribe data bus according to some example versions of the present invention.

Both control entities, mobility control entity (MCF) and service control entity (SCF), need to update concurrently several user plane network elements with exactly the same information, namely updates to tunnel endpoints due to mobility or association of service ports to host addresses, respectively. This can of course be done by using the usual request/response message pattern. Alternatively, according to some example versions of the present invention, it can be done more efficiently by implementing a publish-subscribe data bus (see FIG. 11). A publish-subscribe data bus can be implemented very efficiently by e.g. a reliable multicast, as for example in the "Data Distribution Service" of Object Management Group OMG. With a publish-subscribe data bus there is no need to send a unicast message per base station as it would be necessary with a conventional routing protocol.

It is noted that more details regarding the publish-subscribe data bus will be described later with respect to FIGS. 14 to 21.

VANET Use Case

Figure 12:
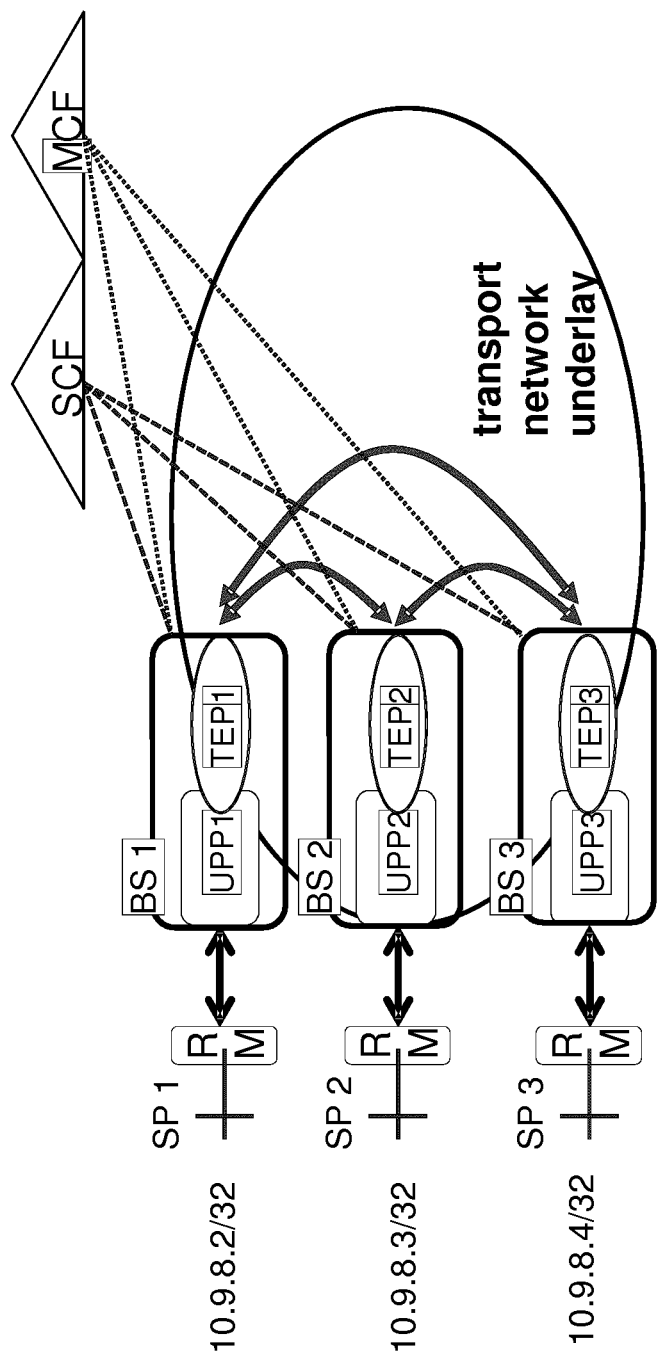
FIG. 12 is a diagram illustrating an example of a VANET scenario according to some example versions of the present invention.

FIG. 12 shows a solution scenario in accordance with some example versions of the present invention for the VANET use case described before in FIG. 4. The service ports SP1 to SP3 of the radio modems (RM) of the three UEs are shown explicitly. Also the service control function and the mobility control function are shown.

According to some example versions of the present invention, each service port SP1 to SP3 of each radio modem is associated with a user plane packet processing function UPP1 to UPP3 in a base station BS1 to BS3. The user plane packet processing functions receive uplink service frames from the associated service ports in the radio modems.

Further, it is assumed that according to some example versions of the present invention, each base station BS1 to BS3 keeps associations between destination service ports SP1 to SP3 and tunnel end points TEP1 to TEP3, respectively. Here, each base station does this by maintaining the associations per service instance in a mobility lookup table. An example of such a table is shown for the service instance "VANET 1" in Table 3.

TABLE 3

| service instance | destination service port | tunnel end point |
|---|---|---|
| VANET1 | SP1 | TEP1 |
| VANET1 | SP2 | TEP2 |
| VANET1 | SP3 | TEP3 |

According to some example versions of the present invention, it is assumed now that each UPP function of the base station selects for each service frame received from the associated service port a destination service port. In this embodiment of the invention it does so by a match of the destination IP address of each service frame (in this example an IP packet) with entries in a service forwarding table as depicted in Table 4.

TABLE 4

| service instance | destination IP address | destination service port |
|---|---|---|
| VANET1 | 10.9.8.2/32 | SP1 |
| VANET1 | 10.9.8.3/32 | SP2 |
| VANET1 | 10.9.8.4/32 | SP3 |

For example, if UPP1 receives from SP1 an IP frame with destination IP address 10.9.8.3 it finds a matching entry in Table 4 with destination service port SP2. According to some example versions of the present invention, UPP1 looks up the destination tunnel end point TEP2 associated with SP2 in Table 3. In a next step, UPP1 encapsulates the service frame into a frame of the transport network underlay using the tunnel header of the selected destination tunnel end point TEP2 and sends this transport frame over the transport network underlay to the destination tunnel end point TEP2. Then, BS2 forwards the service frame to the associated service port SP2, as is state of the art in 3G/4G.

Similarly, all base stations with their respective UPP functions forward service frames in this same manner using identical replica of the service forwarding Table 4 and the mobility lookup Table 3.

According to some example versions of the present invention, it is therefore advantageous that the service control function implements a publish/subscribe data bus to distribute service processing updates (e.g. associations of IP addresses to service ports) to and between the network elements.

Similarly, according to some example versions of the present invention, it is also advantageous that the mobility control functions implements a publish/subscribe data bus to distribute mobility state updates (e.g. association of service ports to tunnel end points) to and between the network elements.

Figure 13:
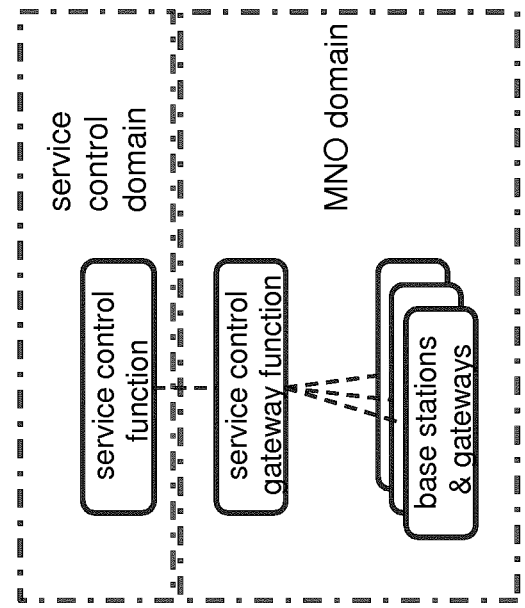
FIG. 13 is a diagram illustrating an example of indirect communication of a service control function with base stations and gateways according to some example versions of the present invention.

Moreover, in a case where the service control function is located in a different administrational domain (a service control domain) it is advantageous for security reasons to interconnect the SCF indirectly via service control gateway function with the network elements (see FIG. 13) of a mobile network operator (MNO) domain.

For example, the SCGF can prevent that the SCF overloads the UPP functions in base stations with a too demanding rate of service forwarding table updates. Or the SCGF can enforce that a specific SCF instance can only use service ports and UE which were assigned previously to that SCF instance.

In the following, the publish-subscribe data bus according to some example versions of the present invention will be described in more detail with respect to FIGS. 14 to 21.

Figure 14:
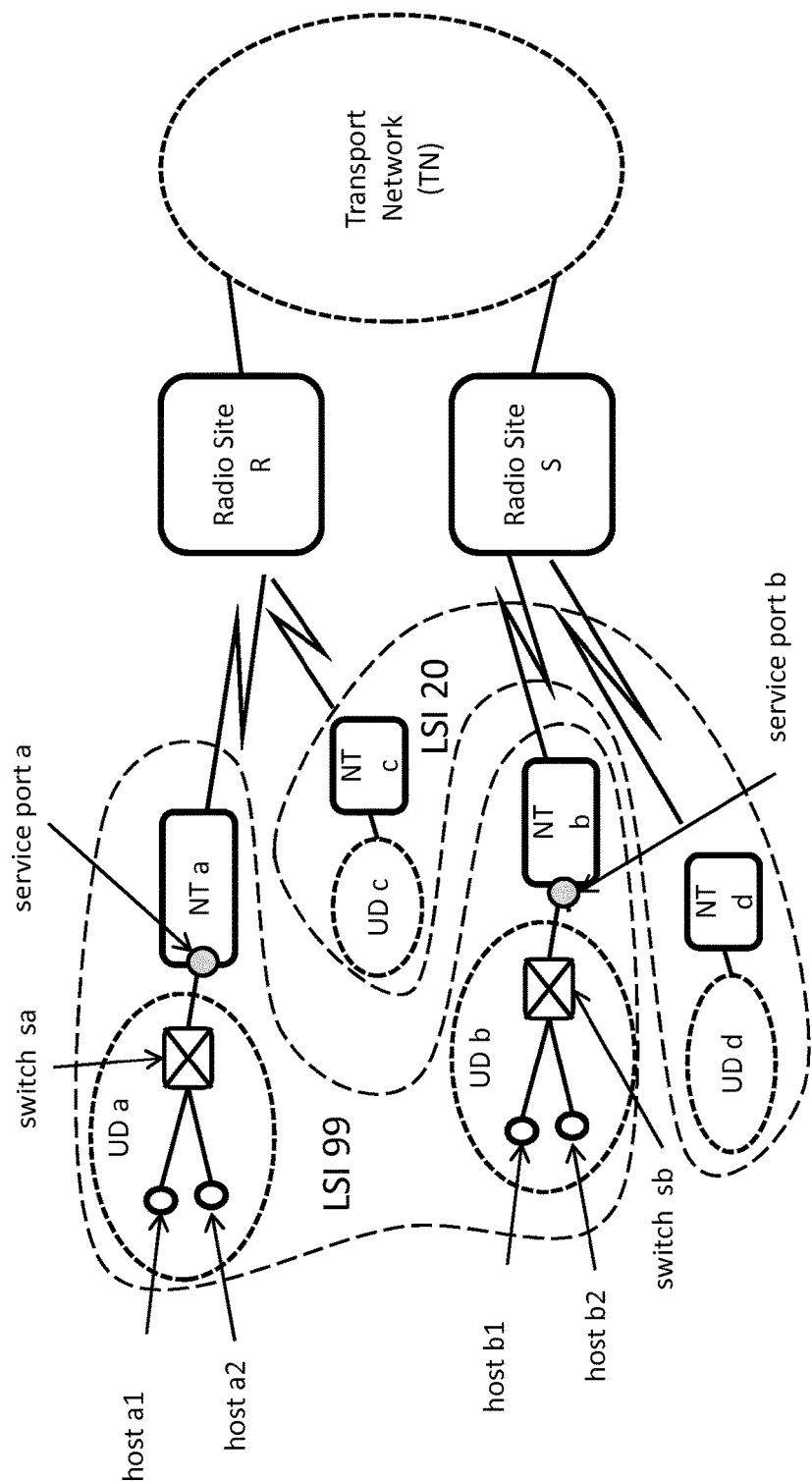
FIG. 14 is a diagram illustrating an example of virtual private network service instances.

FIG. 14 shows a simple example of two VPN service instances LSI 99 and LSI 20 each comprising two network terminations (NT) of users a, b and c, d respectively. A network termination represents the radio modem and gateway to the user domain UD. A user domain may comprise multiple terminals and or devices which use the VPN service of the mobile network to communicate with the terminals and devices in a different user domain, e.g. connected to the same service instance at another radio site.

Figure 15:
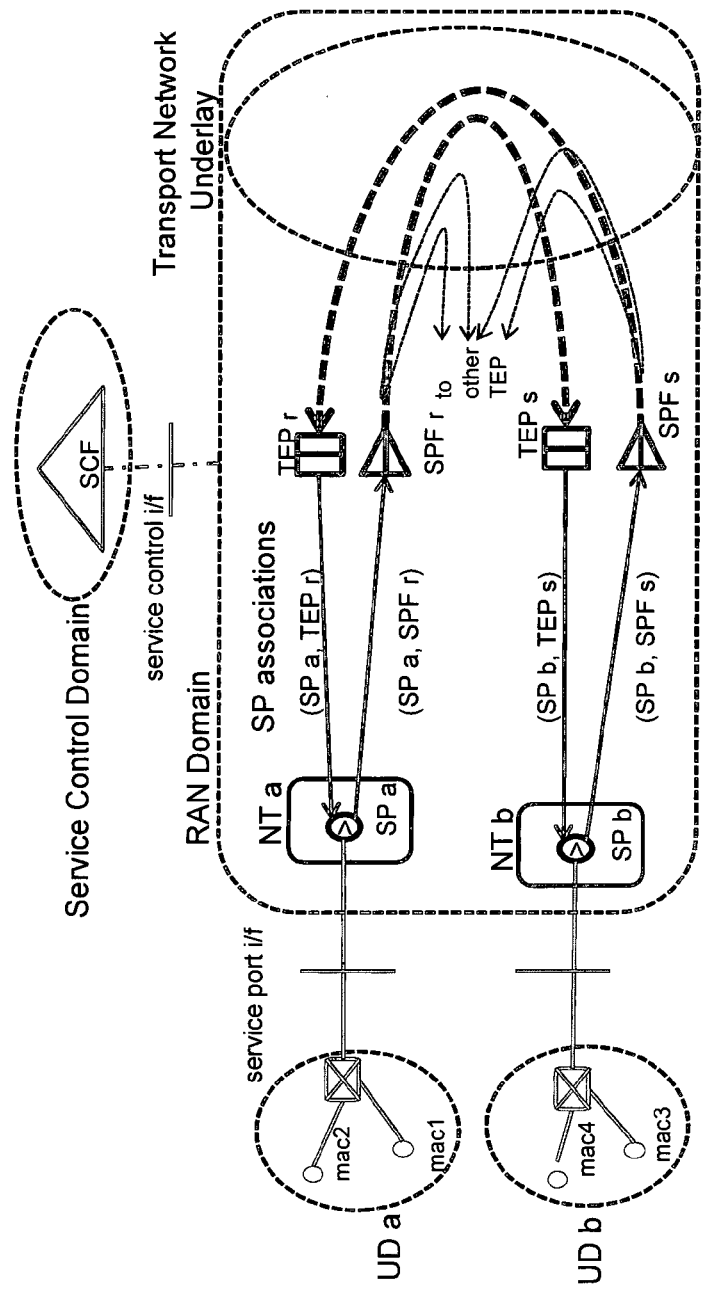
FIG. 15 is a diagram illustrating an example of an architectural setup for supporting the forwarding of service frames directly between radio nodes according to some example versions of the present invention.

FIG. 15 shows another example of an architectural setup for supporting, in a fully distributed way, the forwarding of service frames directly between radio nodes as described above in detail. In summary, radio sites keep forwarding state (or forwarding rules) in tables like shown in Tables 5 and 6 below (similar to Tables 3 and 4 described above). That is, there are two tables, one for keeping the association of service ports (SP) on the NT with the current tunnel end points (TEP) in the service overlay (Table 5), the other table for the assignment of host addresses (mac1 to mac4) to the service ports (SP a and SP b) (Table 6). Each radio site needs at least one copy of these tables for performing the user plane forwarding, as described before.

TABLE 5

| service Instance | NT | service port | TEP |
| --- | --- | --- | --- |
| LSI-99 | NT-a | SP-a | TEP-r |
| LSI-99 | NT-b | SP-b | TEP-s |

TABLE 6

| service instance | destination address | service port |
| --- | --- | --- |
| LSI-99 | mac-1 | SP-a |
| LSI-99 | mac-2 | SP-a |
| LSI-99 | mac-3 | SP-b |
| LSI-99 | mac-4 | SP-b |

According to some example versions of the present invention, there is proposed a solution to the problem of keeping the forwarding tables in the different radio sites consistent, when the service overlay setup changes. Examples of such a service overlay change include the connection of a new service user, the disconnection of a service user and the handover of a service user to another radio site.

Keeping forwarding state in routers (or switches) up-to-date and consistent is a fundamental problem in packet networks. Following solutions are known a) Exchanging state updates by running routing protocols like RIP (Routing Information Protocol), OSPF (Open Shortest Path First), BGP (Boarder Gateway Protocol) directly between router peers. One disadvantage is that the control plane resulting from these protocols is rather heavy weight and is not optimized for fully or strongly meshed topologies of FIG. 15. Also it is not well integrated with a mobile network overlay solution being based on tunnel end point identifiers (TEID). (As opposed to e-2-e LSP tunnels in MPLS (Multiprotocol Label Switching) overlays on top of IP networks.)

b) Routing protocols are explicitly optimized for the case where routers are connected to a L2 broadcast network; e.g. by introducing a Designator Router which runs the routing protocol on behalf of every router on the broadcast network and uses multicast to provide routes to other routers in the broadcast domain. However this cannot directly be applied to the above problem of a meshed overlay network, as there is generally no suitable L2 broadcast domain.

c) Exchanging state updates indirectly via a central BGP route reflector. This relies on a central BGP route reflector. This route reflector represents a potential single point of failure. Also if the signaling connection to the route reflector fails, updates are no longer possible. Of course redundant deployments e.g. using clustering of route reflectors are possible; however these deployments are rather costly. Also sending updates via the route reflector increases latency of the control plane.

d) Disseminating state updates using an SDN-like architecture. I.e. using a centralized forwarding state master database in the SDN controller and sending flow forwarding state updates to the distributed flow switches, using a protocol like OpenFlow. The SDN controller represents a potential single point of failure and sending updates via the SDN controller increases latency in the control plane. If the connection to the SDN controller is interrupted, updates are no longer possible.

e) Relying on "user-plane-learning" combined with a flooding of packets with unknown addresses in the user plane, as usually done in Ethernet switches. One major disadvantage is the danger of broadcast storms, e.g. by circular routing if the topology is not loop free. Also this solution is inefficient in high bandwidth networks as many user plane frames might by flooded, until the user plane has learned the destination address.

The service overlay network indicated in FIG. 15 has a fully meshed topology. All service processing functions at all sites involved in the processing of a given service instance (e.g. LSI99) can utilize the same set of forwarding state (e.g. see Tables 5 and 6). This represents a major simplification to routing over general network topologies as found e.g. in the Internet.

Therefore, according to some example versions of the present invention, it is proposed to use a publish/subscribe (pub/sub) based data-bus to build a simple, yet very efficient distributed communication framework between the sites of a radio network to disseminate updates on service forwarding state and mobility state, i.e. (service port, destination address) and (service port, tunnel end point) associations.

It is noted that the data-bus represents a general communication framework which in addition to what is described in this invention can be used also for other purposes, e.g. for the transfer of security context information.

Figure 16:
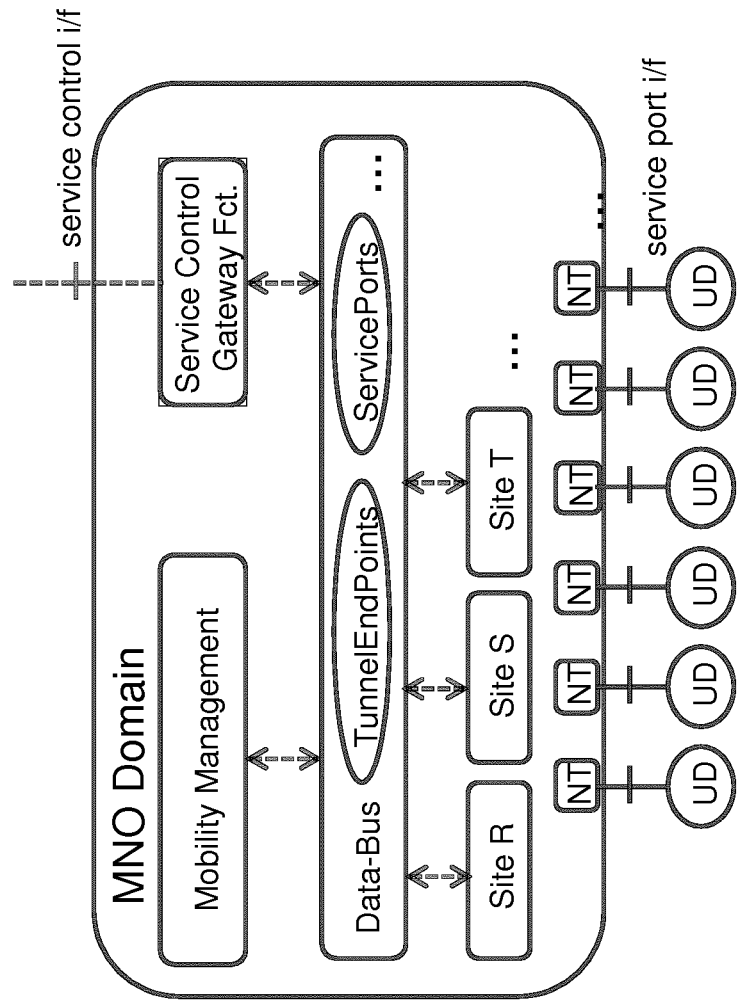
FIG. 16 is a diagram illustrating an example of an architectural setup of a publish-subscribe based data bus according to some example versions of the present invention.

FIG. 16 shows the general architectural setup. A publish/subscribe based data-bus is used to a) disseminate mobility state updates via a 'TunnelEndPoinf' topic b) disseminate service forwarding state updates via a 'ServicePort' topic.

In the following, there is shown an example of a formal description of both topics using Interface Description Language (IDL).

```
struct ServicePort {
    string lsi_id;
    string sp_id;
    string nt_id;
    sequence<macaddress> macs;
}
```

```
#pragma keylist ServicePort lsi_id sp_id
struct TunnelEndPoints {
    string lsi_id;
    string sp_id;
    sequence<tepaddress> tep_addrs;
}
#pragma keylist TunnelEndPoints lsi_id sp_id
```

Both topics have the two fields 'lsi_id' (liquid service instance identifier) and 'sp_id' (service port identifier) which together are specified as key to identify a specific data instance of the respective topic. Additional data, e.g. address information is specified in the other fields of each topic. When e.g. a tunnel end point of a service port needs to be changed, e.g. because a NT is handed over to another radio site, a new data sample for the data instance of that service port containing the address of the new tunnel end-point is published on the data bus. Subscribers to topic 'ServicePort' with the specific lsi_id are notified by the data-bus about that new data sample.

It is noted that the above example data definition allows for a service port to be associated with multiple tunnel end points. This accounts for scenarios where an NT is served by multiple radio links being visible to the service networking layer.

The data-bus can for example be realized by a communication middleware like "Data Distribution Service" (DDS) as standardized by the Object Management Group (OMG). This middleware simply maps topics to one or more multicast-groups in the IP transport network and uses content filters at the subscriber site to implement the subscriptions. One main advantage of the DDS implementation is that it works fully distributed and broker-less, and that it can therefore address dependability requirements of mission critical use cases.

Higher scalable, but more sophisticated implementations of a data-bus are possible with content based routing of intermediate 'data brokers' and by using scoped multicast (cf. RFC2365).

However these are only examples on how a data-bus can be realized, but the implementation of the data-bus itself is not in scope of this invention. Some example versions of the present invention are directed to the application of publish/subscribe based data-bus to the problem of dissemination of service forwarding and mobility state information for virtual overlays in a mobile network.

In the following, there are described two important use cases of some example versions of the present invention. The first use case describes the connection of an NT and its user domain to an existing service instance. The second use case describes the handover of an already connected NT and its user domain to another site.

Use Case: Service Connection

Figure 17:
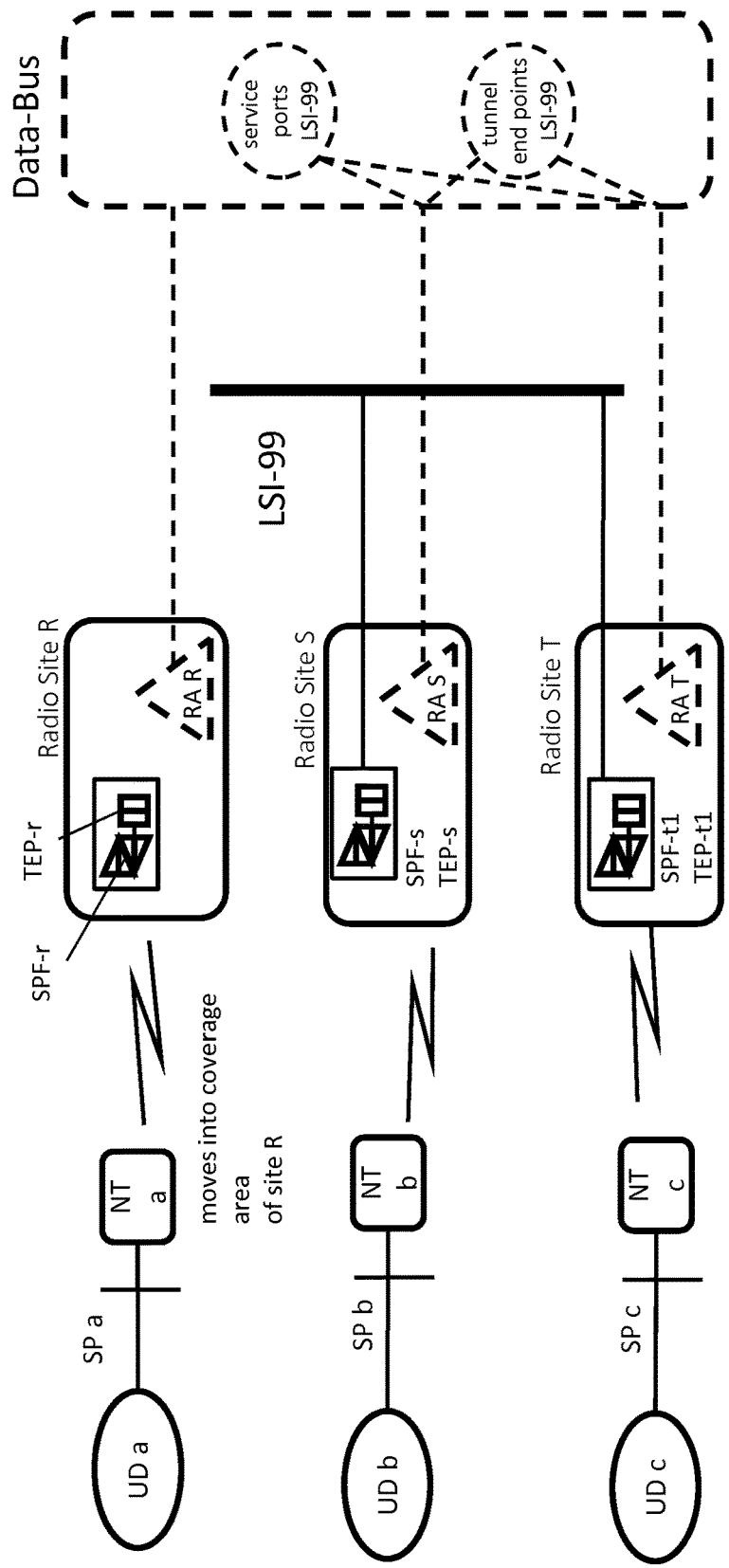
FIG. 17 is a diagram illustrating an example of connecting a network termination to a service instance according to some example versions of the present invention.

FIG. 17 shows a scenario with three radio sites R, S, T. NT-b and NT-c are already connected via service processing functions SPF-s and SPF-t1 and tunnel end points TEP-s and TEP-t1 to a service instance LSI-99. NT-a is still not connected to LSI-99, meaning that mobility and service forwarding state for NT-a is still not known at radio sites S and T.

A service processing function (SPF) decides based on the service frame header and the rules received from the service control function how to process service frames received either from a service port or from a tunnel end point. A special SPF is a service forwarding function (SFF) which looks up to which tunnel end point to forward a service frame received at a service port. Afterwards it performs the corresponding encapsulation using a header of the transport underlay. Note, also that service processing on the receiving site is usually not necessary, i.e. in that direction the service processing function is a null function and frames received at the tunnel end point are just forwarded to the associated service port.

Additionally, each site in example of FIG. 17 hosts a routing agent RA which controls the service forwarding and mobility state of the service processing functions at that site, e.g. it populates and maintains Tables as mentioned above (i.e. Tables 5 and 6). Routing agents communicate indirectly via a data-bus as indicated in FIG. 17. The data-bus defines the two topics "service ports for LSI-99" and "tunnel end-points for LSI-99".

Routing agents S and T have already previously subscribed to both topics (indicated with dashed lines), as NT-b and NT-c at those sites are already connected to the service instance LSI-99. Also, both routing agents have published the corresponding service forwarding and mobility state at their sites to the data-bus. It is also assumed that the network has detected that NT-a is authorized and needs to be connected to the service instance LSI-99 (i.e. SPF r is created and TEP r allocated) and that routing agent R is informed about that.

Figure 18:
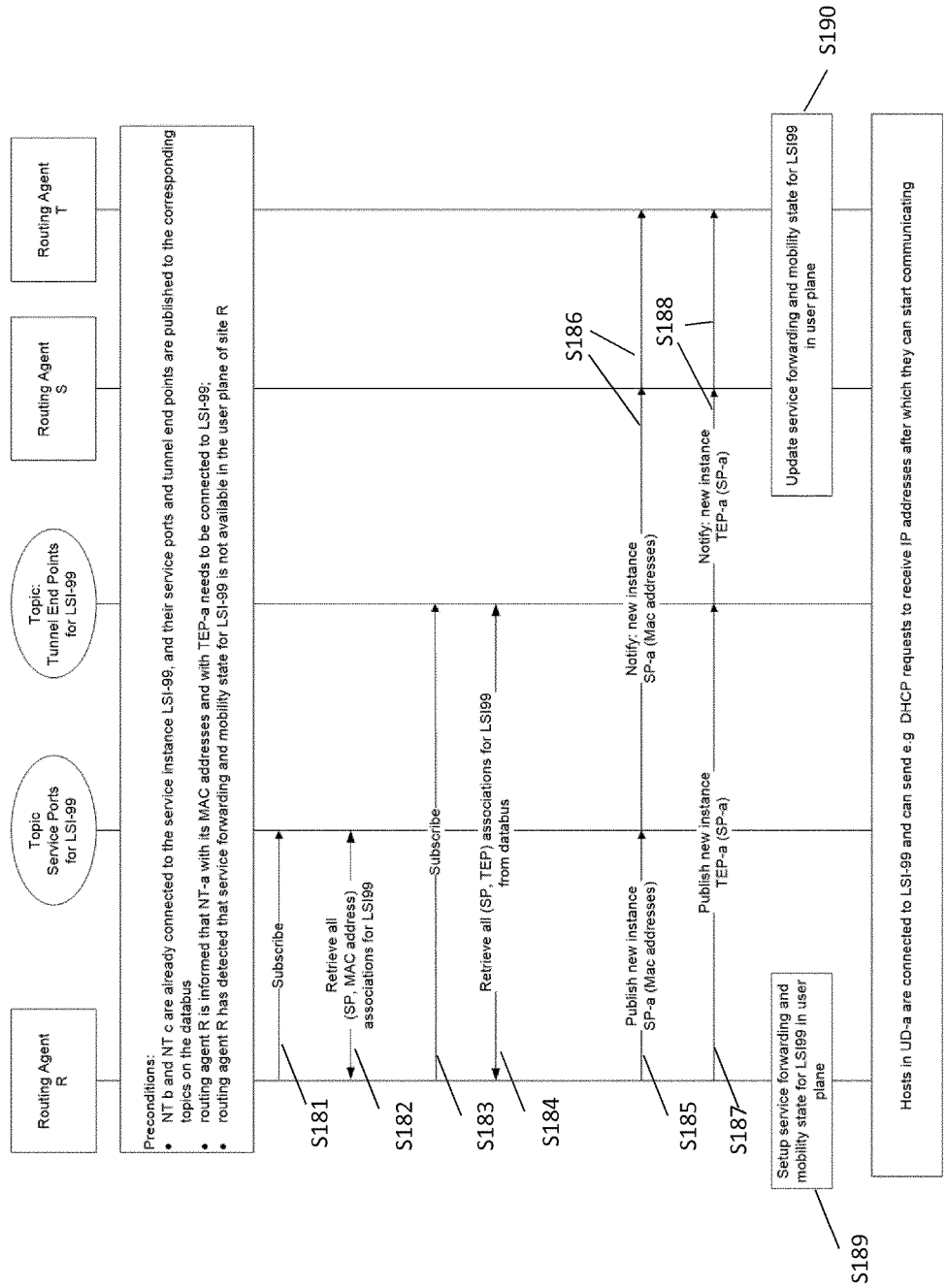
FIG. 18 is a flowchart illustrating a procedure for connecting the network termination to a service instance according to some example versions of the present invention.

FIG. 18 shows an example realization on how the data-bus is utilized to setup the user plane state for LSI-99 in site R and to update the state in the other two sites.

First routing agent R subscribes to the topic "service ports for LSI-99" (S181), after which it retrieves the existing service forwarding state from the data-bus (S182). (Note, it is assumed here that the data-bus supports "durability", i.e. the data-bus is able to provide data samples to agent R which have been published to a topic before agent R had subscribed to that topic.)

Then, the routing agent R also subscribes to topic "tunnel end-points for LSI-99" (S183) and retrieves the mobility state from the data-bus (S184).

After that, the routing agent R publishes a new instance of topic "service ports for LSI-99" adding information about SP-a to the data-bus (S185). This instance includes the identity of SP-a and NT-a as well as all MAC-addresses in user domain UD-a (see FIG. 5).

The MAC-addresses may have been retrieved before from a subscriber repository by the service control function and sent to radio site R. It is to be understood that many different variants for detecting and learning service addresses can be supported by this example versions of the present invention.

Then, the routing agent publishes also a data sample for a new data instance of topic "tunnel end-points for LSI-99" (S187). This data sample associates the service port SP-a with the tunnel end point address TEP-r.

An important advantage of some example versions of the present invention results from the fact that the publication of the data samples on the data-bus can be very efficiently implemented by e.g. a reliable multicast, as in the "Data Distribution Service" of OMG. There is no need to send a unicast message per subscriber as it would be necessary with a conventional routing protocol.

Another important advantage is the resulting referential and location independence between routing agents. A publishing routing agent does not need to know which other sites did subscribe to the topic or where the subscribers are located. This is because data updates are distributed based on the content, namely the topic.

When routing agent R has retrieved the service forwarding state and mobility state of LSI-99 from the data-bus, it sets up the state in the service processing function for SP-a in the user plane of site R (SPF r) (S189).

Similarly the routing agents in site S and T update the service forwarding and mobility state for LSI-99 in the service processing functions of the user plane in sites S and T (i.e. SPF-s and SPF-t1) (S190) after being notified about the new instances and data samples (S186 and S188).

When the user plane is updated, the hosts in user domain UD-a are connected to the service instance LSI-99. The corresponding scenario is shown in FIG. 19.

Use Case: Mobility State Update on Handover

Figure 19:
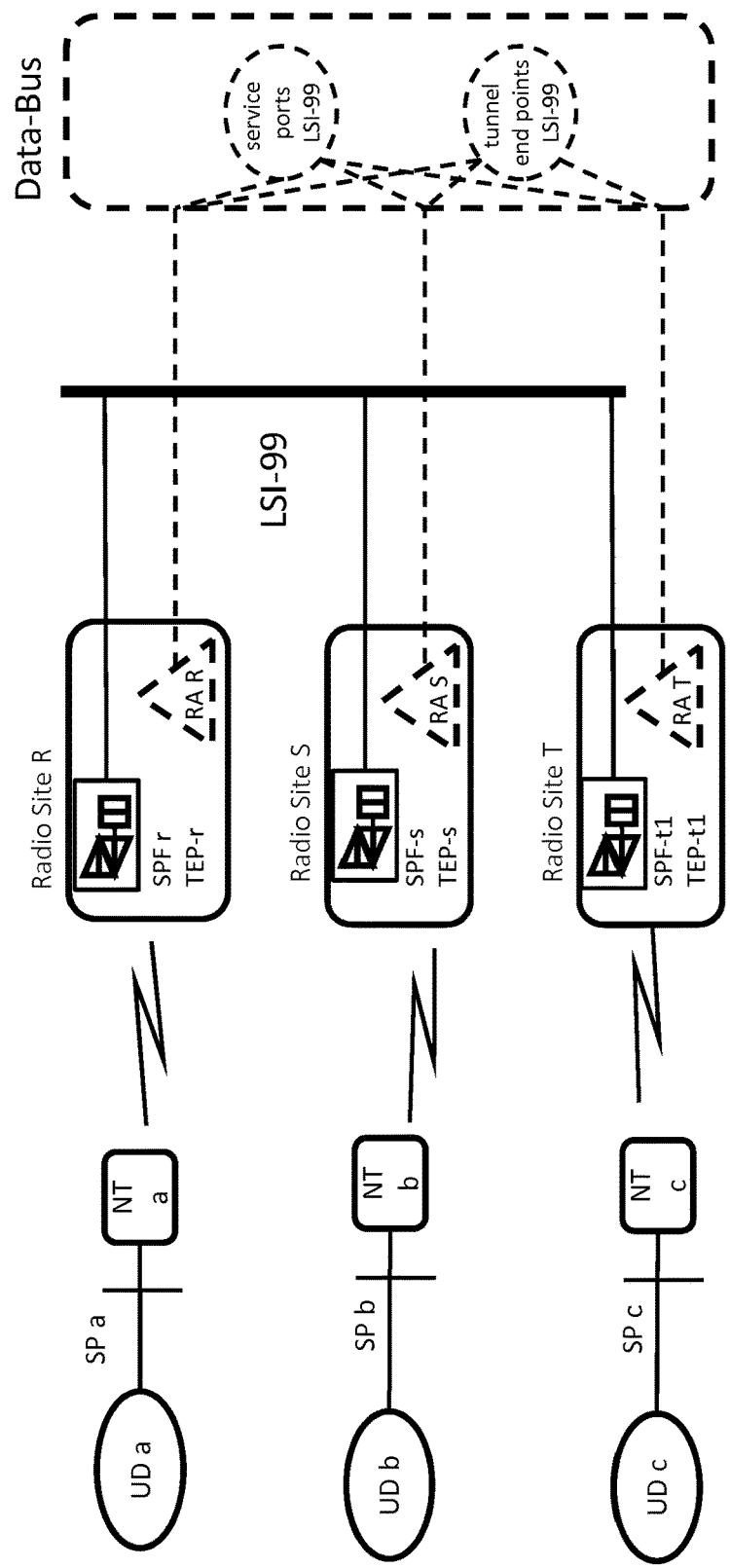
FIG. 19 is a diagram illustrating an example of a scenario in which the network termination is connected to the service instance according to some example versions of the present invention.
Figure 20:
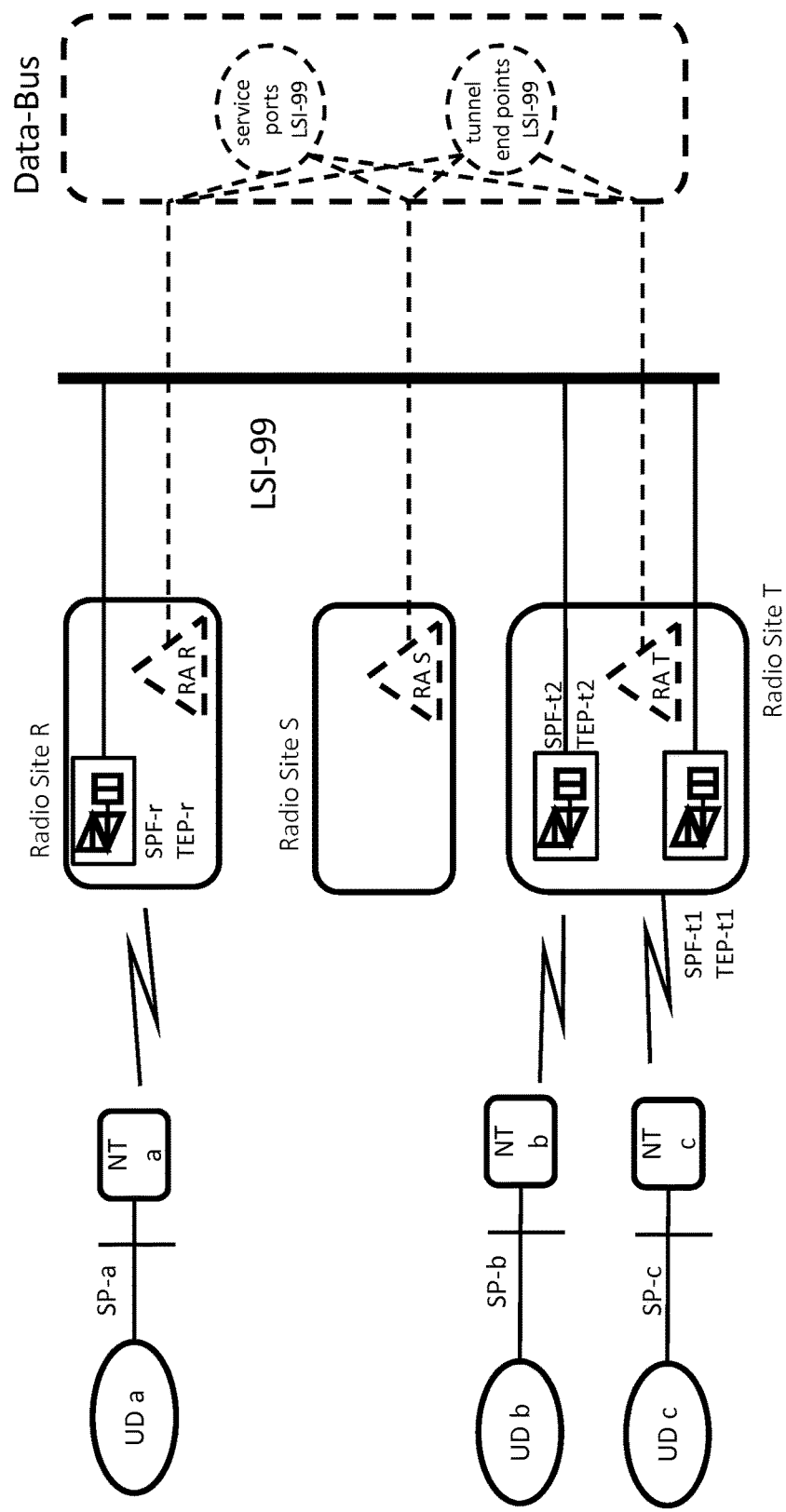
FIG. 20 is a diagram illustrating an example of a scenario in which a network termination is handed over to another radio site according to some example versions of the present invention.

It is now assumed for this use case, that starting from the situation in FIG. 19, NT-b with its connected user domain UD-b moves into the coverage area of radio site T. It is therefore handed over to site T. The target state is shown in FIG. 20.

Figure 21:
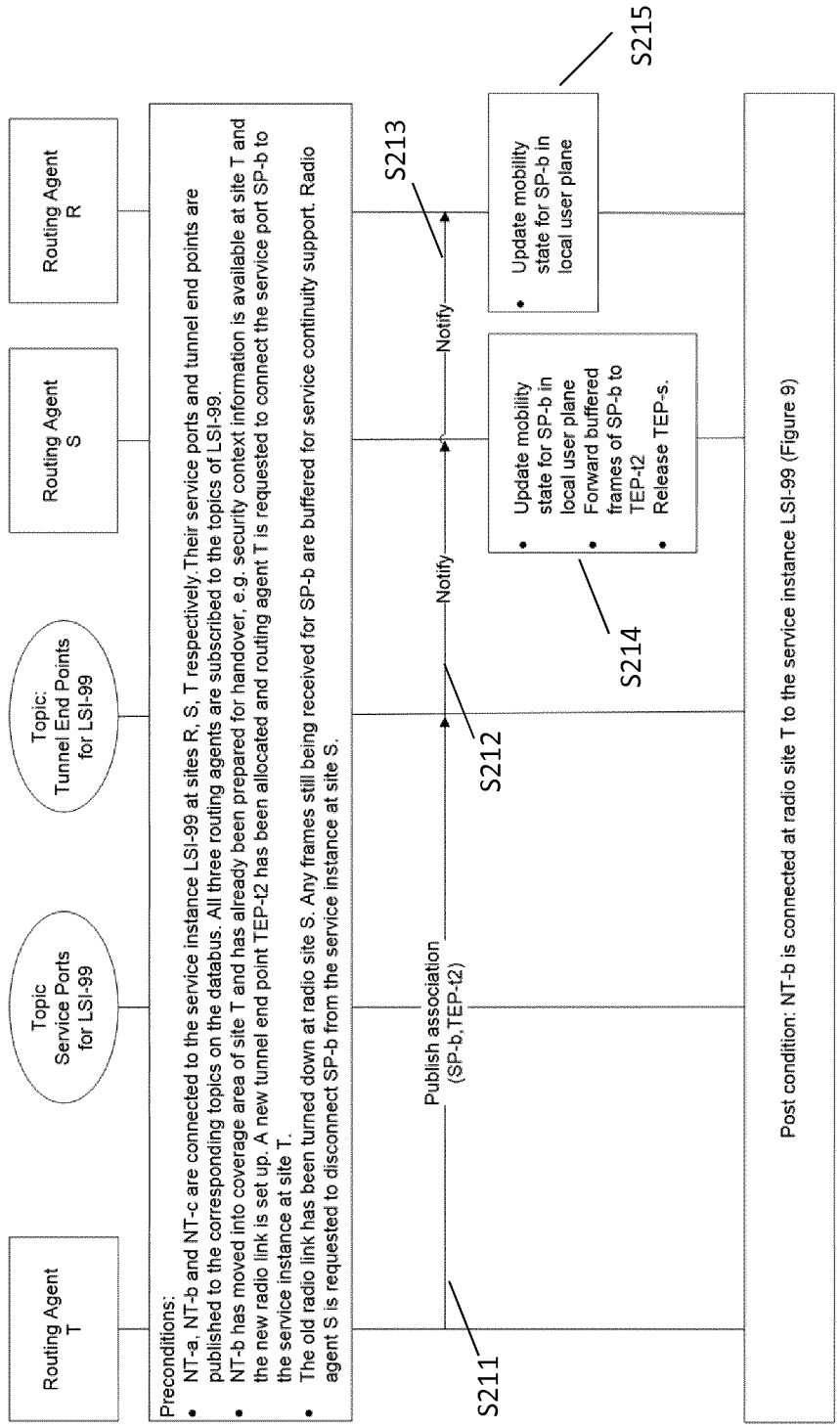
FIG. 21 is a flowchart illustrating a procedure for publishing mobility state updates according to some example versions of the present invention.

FIG. 21 shows how routing agent T updates the mobility state for service port SP-b by publishing the newly allocated tunnel end point TEP-t2 for SP-b at site T to the topic "tunnel end-points for LSI-99" (S211). This notifies the routing agents in site S and R about the new mobility state (S212 and S213). Both routing agents update the mobility state for SP-b in the local user planes of both sites (S214 and S215). Additionally the routing agent S may instruct the service processing function SPF-s to forward any buffered frames still targeted for SP-b to TEP-t2. Finally routing agent S releases TEP-s and the service processing function SPF-s.

In view of the above, according to some example versions of the present invention, the following advantages are achieved:
- compared to existing LTE, where all connections go through a GW thus requiring multiple hops, the proposed solution according to some example versions of the present invention uses single hops, minimizing latency and network bandwidth requirements;
- compared to L3VPN, the proposed solution according to some example versions of the present invention has less complexity. L3VPN over WAN uses MPLS, which has a very complex control plane;
- the proposed solution according to some example versions of the present invention uses typical mobile network functions, e.g. handling tunnel end points; thus, easily applicable to mobility management;
- compared to any known L2 and L3 VPN solution, the proposed solution according to some example versions of the present invention only performs a single forwarding decision at the ingress. In contrast thereto, the state of the art requires that the service frame destination address is looked up and the forwarding is decided at the ingress and at the egress PE element.

In the following, a more general description of example versions of the present invention is made with respect to FIGS. 22 to 24.

Figure 22:
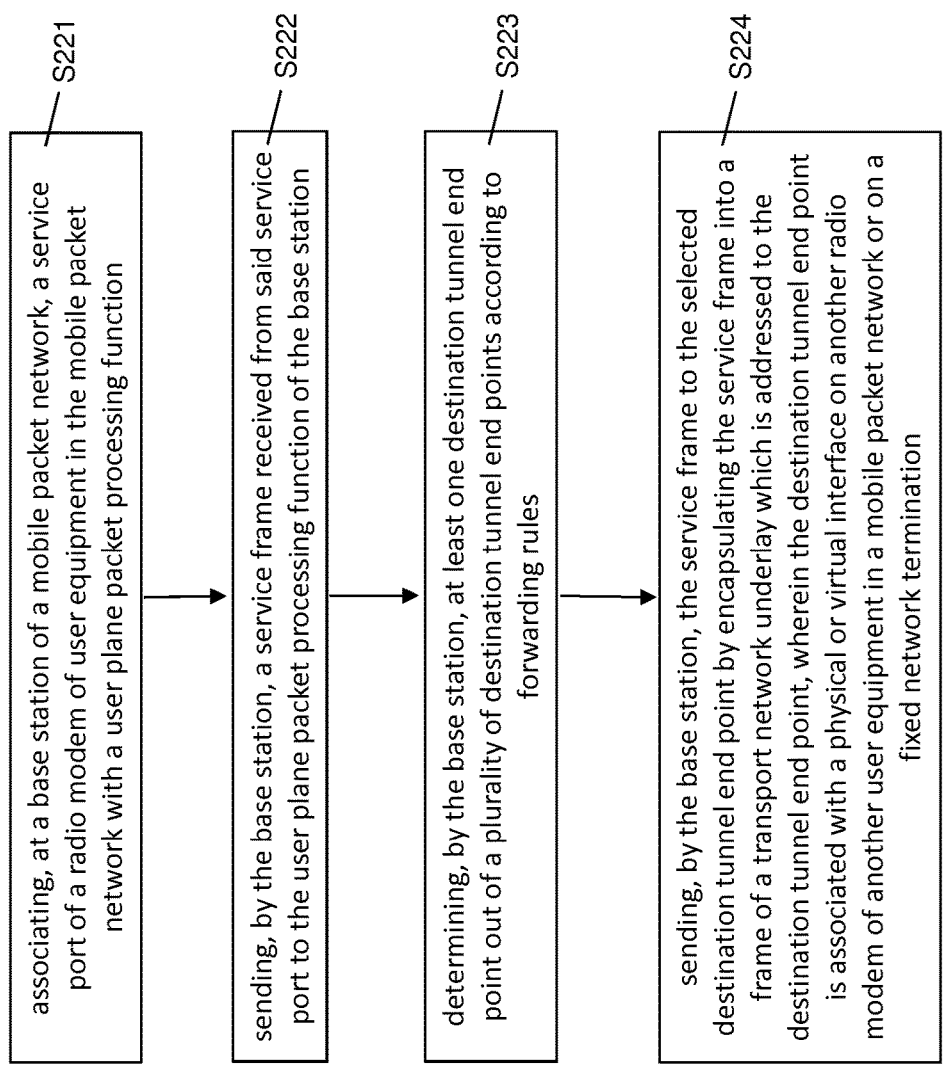
FIG. 22 is a flowchart illustrating an example of a method according to some example versions of the present invention.

FIG. 22 is a flowchart illustrating an example of a method according to example versions of the present invention.

According to example versions of the present invention, the method may be implemented in or may be part of a network element like, for example, a radio base station of a mobile packet network, like for example, a NodeB or evolved NodeB, eNB, or the like. The method comprises associating, at a base station of a mobile packet network, a service port of a radio modem of user equipment in the mobile packet network with a user plane packet processing function in a step S221, sending, by the base station, a service frame received from said service port to the user plane packet processing function of the base station in a step S222, determining, by the base station, at least one destination tunnel end point out of a plurality of destination tunnel end points according to forwarding rules in a step S223, and sending, by the base station, the service frame to the selected destination tunnel end point by encapsulating the service frame into a frame of a transport network underlay which is addressed to the destination tunnel end point in a step S224. The destination tunnel end point is associated with a physical or virtual interface on another radio modem of another user equipment in a mobile packet network or on a fixed network termination.

According to some example versions of the present invention, the destination tunnel end point is determined by the base station by selecting at least one destination service port out of a plurality of destination service ports according to the forwarding rules, and by associating the at least one selected destination service port with a corresponding destination tunnel end point.

According to some example versions of the present invention, the method further comprises receiving, at the base station, all or a subset of the service forwarding rules from a service control function.

According to some example versions of the present invention, all or the subset of the service forwarding rules is received from the service control function via a data bus, the service control function being capable of distributing and/or updating the service forwarding rules via the data bus between multiple network elements.

According to some example versions of the present invention, the method further comprises receiving, at the base station, the association of the at least one selected destination service port with the corresponding destination tunnel end point from a mobility control function.

According to some example versions of the present invention, the association is received from the mobility control function via a data bus, the mobility control function being capable of distributing and/or updating the association via the data bus between multiple network elements.

According to some example versions of the present invention, the destination tunnel end point is determined by the base station from forwarding rules which have resolved destination service ports to destination tunnel end points, wherein the forwarding rules are received from the mobility control function.

According to some example versions of the present invention, the base station interacts with the service control function indirectly via a service control gateway function.

According to some example versions of the present invention, the service frame is encapsulated into a general packet radio service tunneling protocol, GTP-u frame, a generic routing encapsulation, GRE frame, a network virtualization generic routing encapsulation, NVGRE frame, or a virtual extensible local area network, VXLAN frame.

Figure 23:
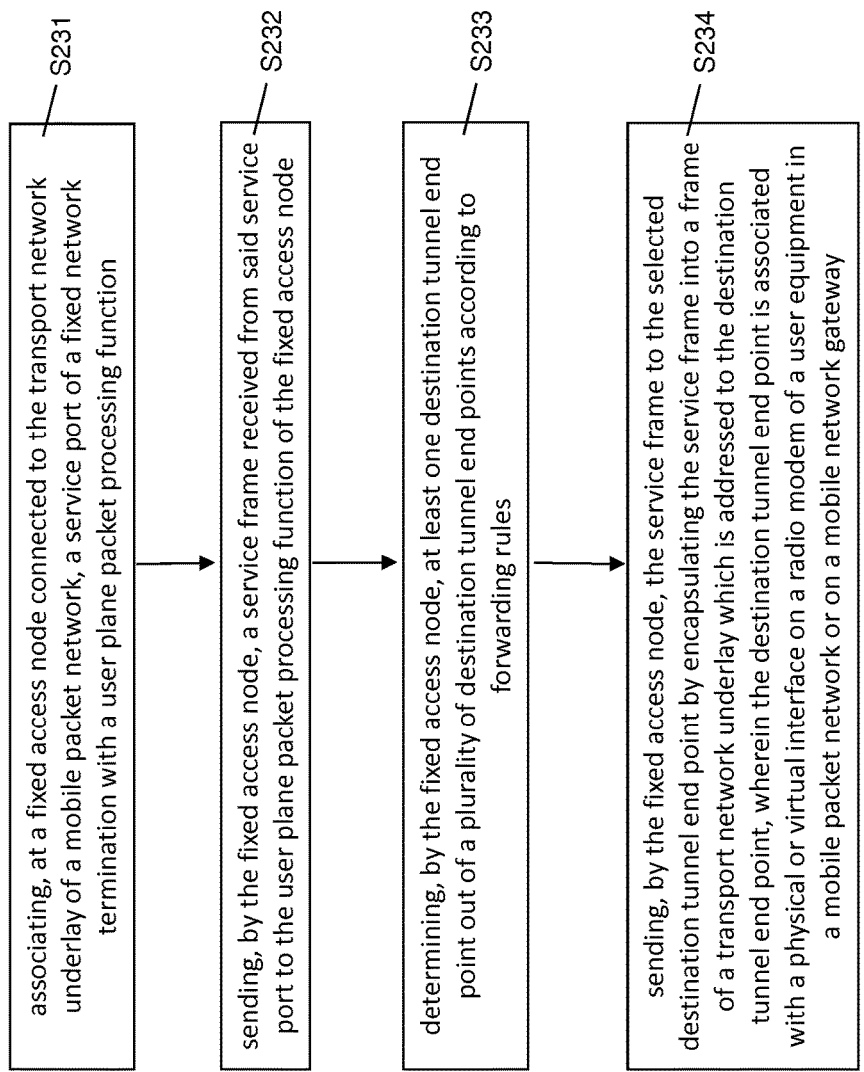
FIG. 23 is a flowchart illustrating another example of a method according to some example versions of the present invention.

FIG. 23 is a flowchart illustrating an example of a method according to example versions of the present invention.

According to example versions of the present invention, the method may be implemented in or may be part of a network element like, for example, a fixed access node connected to the transport network underlay of a mobile packet network, or the like. The method comprises associating, at a fixed access node connected to the transport network underlay of a mobile packet network, a service port of a fixed network termination with a user plane packet processing function in a step S231, sending, by the fixed access node, a service frame received from said service port to the user plane packet processing function of the fixed access node in a step S232, determining, by the fixed access node, at least one destination tunnel end point out of a plurality of destination tunnel end points according to forwarding rules in a step S233, and sending, by the fixed access node, the service frame to the selected destination tunnel end point by encapsulating the service frame into a frame of a transport network underlay which is addressed to the destination tunnel end point in a step S234, wherein the destination tunnel end point is associated with a physical or virtual interface on a radio modem of a user equipment in a mobile packet network or on a mobile network gateway.

According to some example versions of the present invention, the destination tunnel end point is determined by the fixed access node by selecting at least one destination service port out of a plurality of destination service ports according to the forwarding rules, and by associating the at least one selected destination service port with a corresponding destination tunnel end point.

According to some example versions of the present invention, the method further comprises receiving, at the fixed access node, all or a subset of the service forwarding rules from a service control function.

According to some example versions of the present invention, all or the subset of the service forwarding rules is received from the service control function via a data bus, the service control function being capable of distributing and/or updating the service forwarding rules via the data bus between multiple network elements.

According to some example versions of the present invention, the method further comprises receiving, at the fixed access node, the association of the at least one selected destination service port with the corresponding destination tunnel end point from a mobility control function.

According to some example versions of the present invention, the association is received from the mobility control function via a data bus, the mobility control function being capable of distributing and/or updating the association via the data bus between multiple network elements.

According to some example versions of the present invention, the destination tunnel end point is determined by the fixed access node from forwarding rules which have resolved destination service ports to destination tunnel end points, wherein the forwarding rules are received from the mobility control function.

According to some example versions of the present invention, the fixed access node interacts with the service control function indirectly via a service control gateway function.

According to some example versions of the present invention, the service frame is encapsulated into a general packet radio service tunneling protocol, GTP-u frame, a generic routing encapsulation, GRE frame, a network virtualization generic routing encapsulation, NVGRE frame, or a virtual extensible local area network, VXLAN frame.

Figure 24:
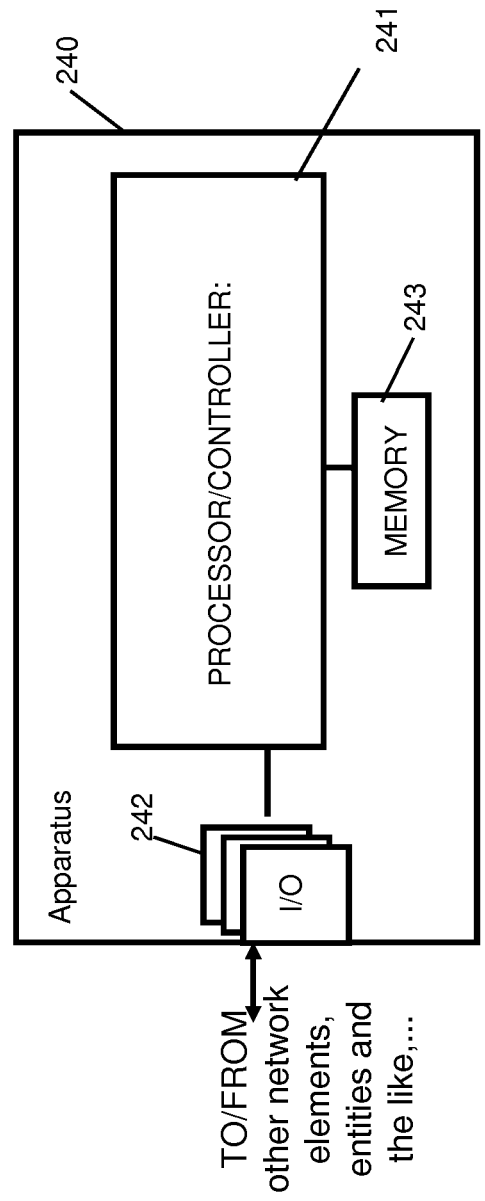
FIG. 24 is a block diagram illustrating an example of an apparatus according to some example versions of the present invention.

FIG. 24 is a block diagram showing an example of an apparatus according to some example versions of the present invention.

In FIG. 24, a block circuit diagram illustrating a configuration of an apparatus 240 is shown, which is configured to implement the above described aspects of the invention. It is to be noted that the apparatus 240 shown in FIG. 24 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 240 may comprise a processing function or processor 241, such as a CPU or the like, which executes instructions given by programs or the like. The processor 241 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 242 denotes transceiver or input/output (I/O) units (interfaces) connected to the processor 241. The I/O units 242 may be used for communicating with one or more other network elements, entities, terminals or the like. The I/O units 242 may be a combined unit comprising communication equipment towards several network elements, or may comprise a distributed structure with a plurality of different interfaces for different network elements. The apparatus 240 further comprises at least one memory 2424 usable, for example, for storing data and programs to be executed by the processor 241 and/or as a working storage of the processor 241.

The processor 241 is configured to execute processing related to the above described aspects. In particular, the apparatus 240 may be implemented in or may be part of a network element like, for example, a radio base station of a mobile packet network, like for example, a NodeB or evolved NodeB, eNB, or the like, and may be configured to perform a method as described in connection with FIG. 22. Thus, the processor 241 is configured to perform associating, at the base station of a mobile packet network, a service port of a radio modem of user equipment in the mobile packet network with a user plane packet processing function, sending, by the base station, a service frame received from said service port to the user plane packet processing function of the base station, determining, by the base station, at least one destination tunnel end point out of a plurality of destination tunnel end points according to forwarding rules, and sending, by the base station, the service frame to the selected destination tunnel end point by encapsulating the service frame into a frame of a transport network underlay which is addressed to the destination tunnel end point, wherein the destination tunnel end point is associated with a physical or virtual interface on another radio modem of another user equipment in a mobile packet network or on a fixed network termination.

According to some example versions of the present invention, the apparatus 240 may be implemented in or may be part of a network element like, for example, a fixed access node connected to the transport network underlay of a mobile packet network, or the like, and may be configured to perform a method as described in connection with FIG. 23. Thus, the processor 241 is configured to perform associating, at the fixed access node connected to the transport network underlay of a mobile packet network, a service port of a fixed network termination with a user plane packet processing function, sending, by the fixed access node, a service frame received from said service port to the user plane packet processing function of the fixed access node, determining, by the fixed access node, at least one destination tunnel end point out of a plurality of destination tunnel end points according to forwarding rules, and sending, by the fixed access node, the service frame to the selected destination tunnel end point by encapsulating the service frame into a frame of a transport network underlay which is addressed to the destination tunnel end point, wherein the destination tunnel end point is associated with a physical or virtual interface on a radio modem of a user equipment in a mobile packet network or on a mobile network gateway.

For further details regarding the functions of the apparatus 240, reference is made to the description of the methods according to some example versions of the present invention as described in connection with FIGS. 22 and 23.

Thus, it is noted that the apparatus for use in a base station, and the apparatus for use in a fixed access node, generally have the same structural components, wherein these components are configured to execute the respective functions of the base station and the fixed access node, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
- method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the aspects/embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

ABBREVIATIONS

| Short | Long | Explanation |
|---|---|---|
| LSI | liquid service instance | A mobile, virtual L2 or L3 service instance |
| MCF | mobility control function | controls the mobility state in a mobile network, e.g. it is responsible to update the tunnel end points of a UE in the respective network elements when the UE is handed over to another base station |

| Short | Long | Explanation |
|---|---|---|
| NT | network termination | a network termination is a function of a service provider network which offers one or more user-network-interfaces to user(s) of network services. A user-network-interface is a specific service port. It represents the administrational demarcation line between a user domain and the service provider domain. A network termination corresponds in LTE to the radio modem part of the UE. |
| P2P | point-to-point | |
| RA | routing agent | exchanges service forwarding and mobility state information with other routing agents at other sites using a publish subscribe pattern |
| RM | radio modem | part of a mobile UE which implements the network termination of a radio network |
| SCF | service control function | controls the rules for processing service frames received from the service ports. These rules may include rules for service frame forwarding to destination service ports, rules for service frame filtering and rules for address resolution (e.g. ARP processing) |
| SCGF | service control gateway function | a security function for screening commands between an SCF of a non-MNO domain and network elements of the MNO |
| SFF | service forwarding function | a service forwarding functions decides based on the service frame header to which tunnel end point to forward a service frame and performs the corresponding encapsulation |
| SP | service port | A service port represents a physical or virtual interface on a network termination or a network gateway at which access to a service instance is made available |
| SPF | service processing function | synonymous to user plane packet processing function (UPP) |
| TEP | tunnel end point | an addressable egress port of an overlay network which can receive service frames from the overlay over a transport network underlay |
| UD | user domain | A network partition of a user which is connected via a service port of the network termination to a service instance |
| UPP | user plane packet processing function | a user plane packet processing functions decides based on the service frame header and the rules received from the service control function how to process service frames received from a service port. For example it may look up to which tunnel end point to forward a service frame after which it performs the corresponding encapsulation. |

The invention claimed is:

1. A method, comprising:
associating, at a base station of a mobile packet network, a service port of a radio modem of user equipment in the mobile packet network with a user plane packet processing function,
sending, by the base station, a service frame received from said service port to the user plane packet processing function of the base station,
determining, by the base station, at least one destination tunnel end point out of a plurality of destination tunnel end points according to forwarding rules, and
sending, by the base station, the service frame to the selected destination tunnel end point by encapsulating the service frame into a frame of a transport network underlay which is addressed to the destination tunnel end point, wherein
the destination tunnel end point is associated with a physical or virtual interface on another radio modem of another user equipment in a mobile packet network or on a fixed network termination.

2. The method according to claim 1, wherein
the destination tunnel end point is determined by the base station
by selecting at least one destination service port out of a plurality of destination service ports according to the forwarding rules, and
by associating the at least one selected destination service port with a corresponding destination tunnel end point.

3. The method according to claim 2, further comprising
receiving, at the base station, the association of the at least one selected destination service port with the corresponding destination tunnel end point from a mobility control function.

4. The method according to claim 3, wherein
the association is received from the mobility control function via a data bus, the mobility control function being capable of distributing or updating the association via the data bus between multiple network elements.

5. The method according to claim 3, wherein
the base station interacts with the service control function indirectly via a service control gateway function.

6. The method according to claim 1, further comprising
receiving, at the base station, all or a subset of the service forwarding rules from a service control function.

7. The method according to claim 6, wherein
all or the subset of the service forwarding rules is received from the service control function via a data bus, the service control function being capable of distributing or updating the service forwarding rules via the data bus between multiple network elements.

8. The method according to claim 1, wherein
the destination tunnel end point is determined by the base station from forwarding rules which have resolved destination service ports to destination tunnel end points, wherein the forwarding rules are received from the mobility control function.

9. The method according to claim 1, wherein
the service frame is encapsulated into a general packet radio service tunneling protocol, GTP-u frame, a generic routing encapsulation, GRE frame, a network virtualization generic routing encapsulation, NVGRE frame, or a virtual extensible local area network, VXLAN frame.

10. A computer program product embodied on a non-transitory computer-readable medium including a program for a processing device, comprising software code portions for performing the method of claim 1 when the program is run on the processing device.

11. A method, comprising:
associating, at a fixed access node connected to the transport network underlay of a mobile packet network, a service port of a fixed network termination with a user plane packet processing function,
sending, by the fixed access node, a service frame received from said service port to the user plane packet processing function of the fixed access node,
determining, by the fixed access node, at least one destination tunnel end point out of a plurality of destination tunnel end points according to forwarding rules, and
sending, by the fixed access node, the service frame to the selected destination tunnel end point by encapsulating the service frame into a frame of a transport network underlay which is addressed to the destination tunnel end point, wherein
the destination tunnel end point is associated with a physical or virtual interface on a radio modem of a user equipment in a mobile packet network or on a mobile network gateway.

12. An apparatus for use in a base station of a mobile packet network, comprising:
at least one processor; and
at least one memory for storing instructions to be executed by the processor, wherein
the at least one memory and the instructions are configured to, with the at least one processor, cause the apparatus at least to perform
associating, at the base station of a mobile packet network, a service port of a radio modem of user equipment in the mobile packet network with a user plane packet processing function,
sending, by the base station, a service frame received from said service port to the user plane packet processing function of the base station,
determining, by the base station, at least one destination tunnel end point out of a plurality of destination tunnel end points according to forwarding rules, and
sending, by the base station, the service frame to the selected destination tunnel end point by encapsulating the service frame into a frame of a transport network underlay which is addressed to the destination tunnel end point, wherein
the destination tunnel end point is associated with a physical or virtual interface on another radio modem of another user equipment in a mobile packet network or on a fixed network termination.

13. The apparatus according to claim 12, wherein
the destination tunnel end point is determined by the base station
by selecting at least one destination service port out of a plurality of destination service ports according to the forwarding rules, and
by associating the at least one selected destination service port with a corresponding destination tunnel end point.

14. The apparatus according to claim 13, wherein the at least one memory and the instructions are further configured to, with the at least one processor, cause the apparatus at least to perform:
receiving, at the base station, the association of the at least one selected destination service port with the corresponding destination tunnel end point from a mobility control function.

15. The apparatus according to claim 14, wherein
the association is received from the mobility control function via a data bus, the mobility control function being capable of distributing or updating the association via the data bus between multiple network elements.

16. The apparatus according to claim 14, wherein
the base station interacts with the service control function indirectly via a service control gateway function.

17. The apparatus according to claim 12, wherein the at least one memory and the instructions are further configured to, with the at least one processor, cause the apparatus at least to perform:
receiving, at the base station, all or a subset of the service forwarding rules from a service control function.

18. The apparatus according to claim 17, wherein
all or the subset of the service forwarding rules is received from the service control function via a data bus, the service control function being capable of distributing or updating the service forwarding rules via the data bus between multiple network elements.

19. The apparatus according to claim 12, wherein
the destination tunnel end point is determined by the base station from forwarding rules which have resolved destination service ports to destination tunnel end points, wherein
the forwarding rules are received from the mobility control function.

20. The apparatus according to claim 12, wherein
the service frame is encapsulated into a general packet radio service tunneling protocol, GTP-u frame, a generic routing encapsulation, GRE frame, a network virtualization generic routing encapsulation, NVGRE frame, or a virtual extensible local area network, VXLAN frame.

* * * * *